(12) United States Patent
Dufresne

(10) Patent No.: US 11,926,915 B2
(45) Date of Patent: Mar. 12, 2024

(54) ANCHOR SYSTEMS FOR LIFTING AN ELECTROLYTIC VESSEL

(71) Applicant: PULTRUSION TECHNIQUE INC., Saint-Bruno-de-Montarville (CA)

(72) Inventor: Robert Dufresne, Saint-Bruno-de-Montarville (CA)

(73) Assignee: PULTRUSION TECHNIQUE INC. (CA)

( * ) Notice: Subject to any disclaimer, the term of this patent is extended or adjusted under 35 U.S.C. 154(b) by 879 days.

(21) Appl. No.: 16/963,609

(22) PCT Filed: Jan. 29, 2019

(86) PCT No.: PCT/CA2019/050106
§ 371 (c)(1),
(2) Date: Jul. 21, 2020

(87) PCT Pub. No.: WO2019/144246
PCT Pub. Date: Aug. 1, 2019

(65) Prior Publication Data
US 2021/0062352 A1 Mar. 4, 2021

Related U.S. Application Data

(60) Provisional application No. 62/623,281, filed on Jan. 29, 2018.

(51) Int. Cl.
*C25C 7/06* (2006.01)
*B66C 1/66* (2006.01)
*F16B 45/00* (2006.01)

(52) U.S. Cl.
CPC .............. *C25C 7/06* (2013.01); *B66C 1/663* (2013.01); *F16B 45/00* (2013.01)

(58) Field of Classification Search
CPC ....................................................... C25C 7/06
See application file for complete search history.

(56) References Cited

FOREIGN PATENT DOCUMENTS

| CA | 2742174 A1 | 5/2010 |
|----|------------|--------|
| CA | 2968421 A1 | 5/2016 |

(Continued)

OTHER PUBLICATIONS

Canadian Intellectual Property Office; International Search Report and Written Opinion for International Patent Application No. PCT/CA2019/050106 dated Apr. 9, 2019.

*Primary Examiner* — Alexander W Keeling
(74) *Attorney, Agent, or Firm* — Parsons Behle & Latimer

(57) ABSTRACT

A liftable electrolytic vessel including at least one anchor assembly being at least partially embedded in each of two opposed core walls to provide anchorage to a lifting accessory of a lifting device; and related method for lifting the electrolytic vessel. Each anchor assembly comprises an anchor having a strap slot, and a strap connected to the anchor and extending from the anchor along and inside at least a portion of the corresponding core wall. The anchor further includes a connector which is sized and configured to receive a fastener or engage a lifting accessory such as a chain or a hook. The anchor assembly may include one anchor provided at each end of the strap. A plurality of anchor assemblies may extend vertically and horizontally within a core of the vessel to offer various anchorage points from an outer surface of the core. Design of the anchor of a first anchor assembly may differ from the design of a second anchor assembly. A lifting accessory is further designed to be securable to each anchor of the vessel.

19 Claims, 37 Drawing Sheets

(56) References Cited

FOREIGN PATENT DOCUMENTS

| | | | |
|---|---|---|---|
| CA | 3001919 A1 | 4/2017 | |
| CA | 3032315 A1 | 2/2018 | |
| DE | 3127859 A1 | 2/1983 | |
| WO | WO-2016128825 A1 * | 8/2016 | ............... C25C 3/10 |
| WO | WO-2016174313 A1 * | 11/2016 | |

* cited by examiner

ANCHOR SYSTEMS FOR LIFTING AN ELECTROLYTIC VESSEL

TECHNICAL FIELD

The present invention relates to lifting techniques for an electrolytic vessel, and more particularly to the use of anchor assemblies and related lifting accessory to perform such lifting.

BACKGROUND

Electrolytic vessels for hydrometallurgical refining of metals are conventionally provided adjacent to one another, often in side-to-side relation. Adjacent cells may be glued to each other to form a single row of cells. The size, materials and configuration of adjacent electrolytic vessels, render the maintenance or replacement of a vessel an arduous operation.

An electrolytic vessel is usually lifted for such operation, thereby submitted the vessel to dynamic loads which can lead to damaging and cracking the electrolytic cavity of the vessel, usually made of concrete. When an electrolytic vessel has to be replaced, maintained or cleaned, there may be also insufficient space in between adjacent electrolytic vessels to pass the desired cables, straps, slings, curtains or other equipment.

There is a number of challenges related to handling electrolytic cells that are located or positioned in close proximity to each other or with respect to walls or other hindrances.

SUMMARY

The systems and techniques described herein provide a solution for lifting, transporting and placing adjacent electrolytic vessels, as represented in FIG. 1, in an industrial environment where an overhead crane or a dart mobile lifting crane is generally used as a lifting device. There is provided an anchor assembly which is integrated within the electrolytic vessel itself and which is configured to provide anchorage to the lifting device while absorbing and distributing the dynamic loads applied to the vessel. The various embodiments described herein in relation to such electrolytic vessel contribute to reducing cracking of the vessel walls upon application of dynamic loads and without jeopardizing the integrity of the electrolytic cavity of the vessel during operation (for example, by avoiding contact of metallic pieces with contact bars or electrodes used for refining).

There is provided an electrolytic vessel for refining metals and being liftable by a lifting device. The electrolytic vessel includes a core shaped to hold an electrolytic liquid, the core comprising a core base for contacting the floor, and four core walls extending upwardly from peripheral edges of the core base. The vessel further includes at least one anchor assembly being embedded in each of two opposed core walls. Each anchor assembly includes an anchor providing anchorage to a lifting accessory of the lifting device; and a strap connected to the anchor and extending from the anchor along and inside at least a portion of the corresponding core wall.

In a first aspect, the electrolytic vessel includes a core shaped to hold an electrolytic liquid, the core comprising a core base for contacting the floor, and four core walls extending upwardly from peripheral edges of the core base. The electrolytic vessel further includes at least one anchor assembly being at least partially embedded in each of two opposed core walls. Each anchor assembly includes an anchor providing anchorage to a lifting accessory of the lifting device; and a strap connected to the anchor and extending from the anchor along and inside at least a portion of the corresponding core wall.

In some implementations of the vessel, the anchor includes a main component having a strap slot for receiving the strap therein; and a connector mounted about the main component and connectable to the lifting accessory.

In some implementations of the vessel, the connector is protruding from an outer surface of the core. In other implementations of the vessel, the connector is embedded in the core and connectable to the lifting accessory via at least one aperture in the outer surface of the core. Optionally, the connector is embedded in a flushed configuration with respect to the outer surface of the core.

In some implementations of the vessel, the at least one aperture is defined in an external surface of one of the two opposed core walls. Optionally, the at least one aperture is defined in a bottom surface of the core base.

In some implementations of the vessel, the main component comprises a main portion including the strap slot and the connector comprises two branch portions extending outwardly from the main portion, each branch portion having a channel sized to receive a mating fastener of the lifting accessory, and each channel being accessible from one aperture in the core.

In some implementations of the vessel, the connector further comprises a pair of barrel bolts, and each channel of the connector is provided at a distal end thereof with one barrel bolt sized and shaped to receive and offer abutment to a portion of the mating fastener protruding from the channel. Optionally, the barrel bolt includes a threaded barrel and a distal plate which is mounted on a distal end of the threaded barrel for offering the abutment to the portion of the mating fastener.

In some implementations of the vessel, the main component comprises a main portion including the strap slot and the connector comprises a distal plate protruding radially from a distal end of the main portion, the distal plate including at least two channels and each channel being sized to receive a mating fastener of the lifting accessory and being accessible from one aperture in the core.

In some implementations of the vessel, the connector further comprises at least two barrels and nut assemblies, and each channel having a diameter adapted to cooperate at a proximal end thereof with one barrel and at a distal end thereof with a nut.

In other implementations of the vessel, the connector is a hook and the lifting accessory includes a loop which is engageable with the hook. Optionally, the hook is molded with the main component as a one-piece structure.

In some implementations of the vessel, the anchor is a distal anchor connected at one end of the strap and the anchor assembly further comprises a proximal anchor connected at another end of the strap.

In some implementations of the vessel, the anchor is a distal anchor connected at one end of the strap and the anchor assembly further comprises a proximal main component having a strap slot to receive another end of the strap.

In some implementations, the vessel may include two anchor assemblies embedded within each of the four core walls.

In some implementations of the vessel, the anchor of a first anchor assembly embedded within a first core wall is connected to the anchor of a second anchor assembly embedded within a second core wall which is adjacent to the first core wall.

In some implementations, the vessel can include two anchor assemblies spaced apart within each of the two opposed core walls and the electrolytic vessel further comprising a pair of joining assembly, each joining assembly being sized for joining the two anchor assemblies. Optionally, each joining assembly comprises a proximal joining component and a distal joining component, each joining component having a strap slot; and a joining strap having a distal end received in the strap slot of the distal joining component and a proximal end received in the strap slot of the proximal joining main component. Further optionally, the proximal joining component is connected to the anchor of one of the two anchor assemblies and the distal joining component can be connected to the anchor of the other anchor assembly.

In some implementations of the vessel, at least one strap extends horizontally from one side edge of the core wall to an opposed side edge of the core wall. In some implementations of the vessel, at least one strap extends vertically from an upper portion of the core wall to a lower portion of the core wall.

In some implementations of the vessel, a first strap extends horizontally in an upper portion of the core wall and a second strap extends horizontally in a lower portion of the core wall.

In some implementations of the vessel, at least two anchor assemblies are at least partially embedded in each of the two opposed core walls.

In some implementations of the vessel, the two anchor assemblies are distributed symmetrically within a same core wall.

In some implementations, the vessel can further include at least one flat rebar embedded within each of the two opposed core walls.

In some implementations, the vessel can include a fiberglass-based envelope surrounding the core of the vessel.

In another aspect, there is provided a system for lifting an electrolytic vessel upon actuation of a lifting device, the system comprising the electrolytic vessel and a lifting accessory connectable to the lifting device. The electrolytic vessel includes a core shaped to hold an electrolytic liquid, the core comprising a core base for contacting the floor, and four core walls extending upwardly from peripheral edges of the core base. The electrolytic vessel further includes at least one anchor assembly being at least partially embedded in each of two opposed core walls. Each anchor assembly includes an anchor providing anchorage to a lifting accessory of the lifting device; and a strap connected to the anchor and extending from the anchor along and inside at least a portion of the corresponding core wall. The lifting accessory is anchored to the anchor of the at least one anchor assembly.

In some implementations of the system, the anchor comprises a hook and the lifting accessory comprises a chain or a complementary hook engageable with the hook of the anchor.

In some implementations of the system, the anchor comprises at least one channel and the lifting accessory comprises at least one mating fastener sized to be received within the at least one channel; and a lifting plate comprising at least one aperture which is aligned with respect to a distal end of the at least one channel so as to be secured to the anchor via insertion of the at least one mating fastener in the aperture and the channel.

In another aspect, there is provided a lifting accessory connectable to a lifting device for lifting an electrolytic vessel including at least one anchor offering anchorage at an external surface of the electrolytic vessel. The lifting accessory includes at least one mating fastener sized to be received within at least one channel of the anchor; and a lifting plate comprising at least one aperture which is aligned with respect to a distal end of the at least one channel so as to be secured to the anchor via insertion of the at least one mating fastener in the aperture and the channel.

In another aspect, the is provided a process of manufacturing an electrolytic vessel as defined herein, the process comprising
  forming an inner envelope having a rectangular base and four walls protruding from edges of the base;
  forming an outer envelope along the inner envelope, and leaving a space between the inner envelope and the outer envelope to form a cavity;
  placing at least one anchor assembly in each of two opposed cavity regions at a desired location;
  holding each anchor assembly at the desired location; and
  filling the cavity with a core material to create the core of the vessel.

In another aspect, there is provided a method for lifting an electrolytic vessel equipped with at least two anchor assemblies as defined herein with a lifting device, the method comprising:
  securing the lifting accessory of the lifting device to the connector of the anchor assembly; and
  lifting the vessel upon actuation of the lifting device, the dynamic loads applied to the vessel during lifting being absorbed and distributed within the vessel according to a configuration of the anchor assemblies.

While the invention will be described in conjunction with example embodiments, it will be understood that it is not intended to limit the scope of the invention to such embodiments. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

DETAILED DESCRIPTION

Figure 1:
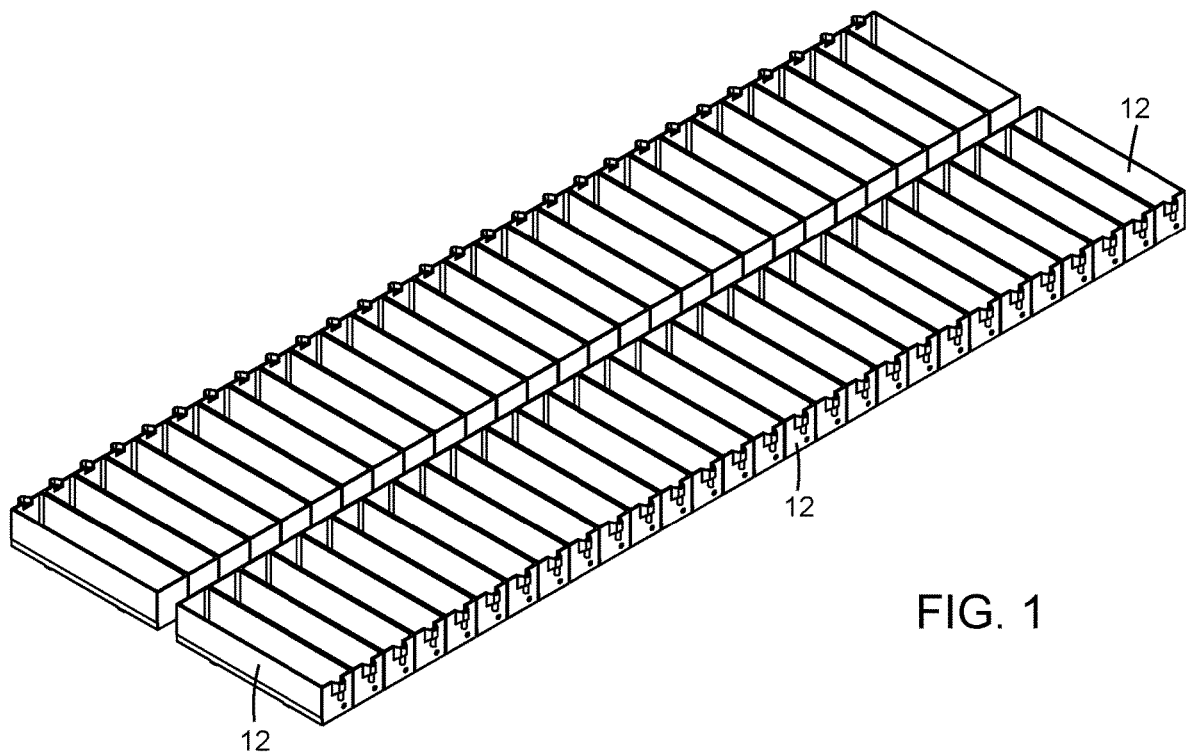
FIG. 1 is a perspective view of a plurality of adjacent electrolytic vessels organized in parallel rows.

Although the embodiments of the electrolytic vessel and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation therein between, as well as other suitable geometrical configurations, may be used for anchor assemblies and resulting electrolytic vessels, as will be briefly explained herein and as can be easily inferred herefrom by a person skilled in the art. Moreover, it will be appreciated that positional descriptions such as "above", "below", "horizontal", "vertical", "distal", "proximal", and the like should, unless otherwise indicated, be taken in the context of the figures and should not be considered limiting.

It should be noted that the anchor assemblies described herein may be particularly suited for use in combination with an overhead crane or a dart mobile lifting crane as generally used in industrial facilities, which is equipped with a hoist and a lifting accessory. However, one skilled in the art will understand that parts of the anchor assemblies may be easily adapted to any lifting device able to lift an electrolytic vessel of industrial size.

| List of reference numerals | |
|---|---|
| Reference numeral | Element |
| 2, 20a, 20b, 206, 210 | anchor assembly |
| 208, 208a, 208b | joining assembly |
| 4, 4a, 4b | anchor |
| 6, 6a, 6b | strap |
| 8, 80, 800, 808 | main component |
| 82, 82a, 82b 802 | branch portion of main component 80, 800 serving as connector |
| 84, 804 | main portion of main component 80, 800 |
| 86, 806 | channel of main component 80, 800 |
| 802 | base of main component 800 |
| 804 | distal plate of main component 800 |
| 10 | connector (e.g. hook) |
| 100 | barrel bolt |
| 102 | theaded barrel of barrel bolt 100 |
| 103 | barrel of connector 10 |
| 104 | distal plate of barrel bolt 104 |
| 106 | nut |
| 12 | electrolytic vessel |
| 14 | core of the vessel 12 |

-continued

| List of reference numerals | |
|---|---|
| Reference numeral | Element |
| 16 | base of the core 14 |
| 18 | walls of the core 14 |
| 22 | flat rebar |
| 24 | lifting plate |
| 26 | lifting accessory |
| 28 | screw |
| 30 | linking accessory |

Anchor Assembly Implementations

Various embodiments of the anchor assembly (2, 20, 200, 202, 204, 206, 208, 210) are represented in FIGS. 4, 5, 7, 8, 12 to 17, 20, 21, 29 to 32, 34 to 37, 40, 46, 47, and 54 to 58.

Figure 4:
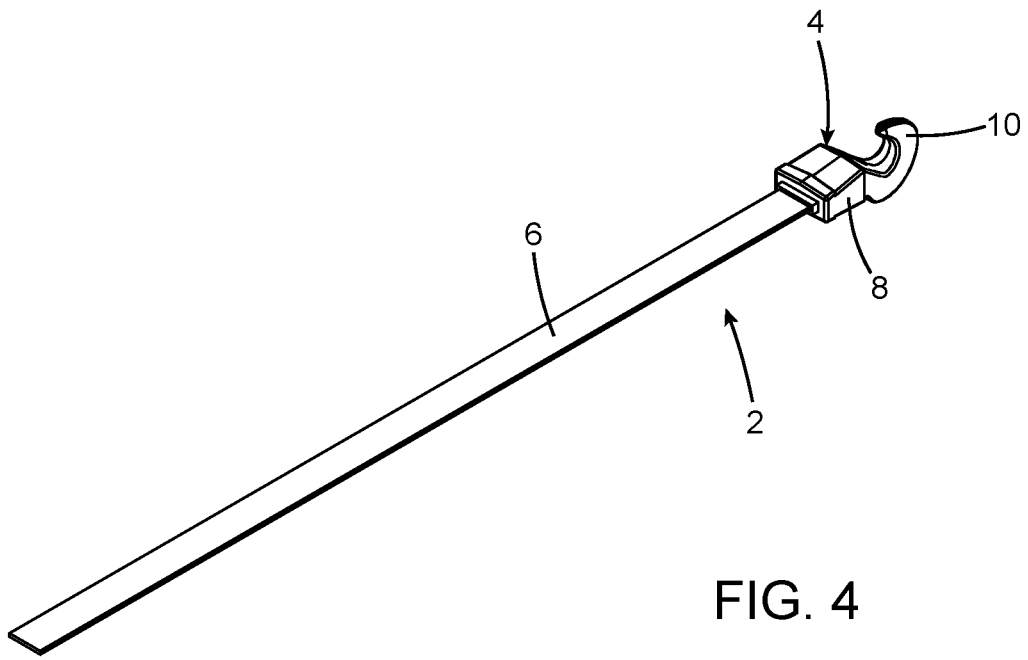
FIG. 4 is a perspective view of one anchor assembly from the vessel of FIG. 2.
Figure 5:
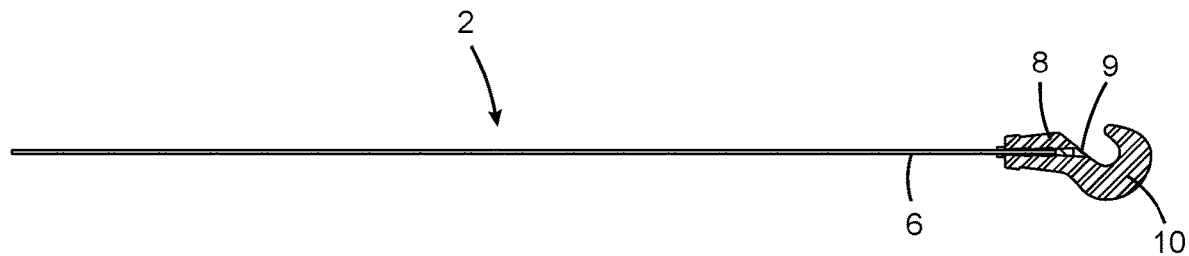
FIG. 5 is a cross-sectional view of the anchor assembly of FIG. 4.

As for example seen on FIG. 4, an anchor assembly (2) as encompassed herein comprises an anchor (4) and a strap (6) which is connected to the anchor (4). The anchor of the anchor assembly provides anchorage to a lifting accessory of the lifting device used for the lifting, transport and placement of the vessel. At least a portion of the strap is embedded within the electrolytic vessel so as to absorb and distribute dynamic loads applied to the vessel during lifting, transport and placement, thereby avoiding cracking of the vessel.

Materials of the strap may be selected according to the strength and flexibility desired. For example, nylon, fiberglass or polyester could be used for flexibility whereas steel or other adequate metallic materials may be chosen to provide strength to the strap.

The anchor can be described as including a main component and a connector. The main component serves as a link between the connector and the strap, the strap being connected to the main component and the connector being connectable to the lifting accessory of the lifting device.

Cooperation of the strap (6) with the main component (8, 80, 800, 808) may be better seen in FIGS. 5, 13, 21, 32 and 37. The main component (8, 80, 800, 808) of the anchor (4) includes a strap slot (9), optionally having a dove tail shape, for connecting the strap (6) to a bottom edge of the main component (8, 80, 800, 808).

In some implementations, the strap may be connected to the main component by chemical fixation. More particularly, at least one end of the strap may be inserted into the strap slot of the main component and chemically fixed therein, optionally using a non-corroding adhesive that may include epoxy, thermoset resin, polyester, vinyl ester, acrylic, silicone, or thermal glue. The thermal glue may include polypropylene and/or polyethylene. Other connection means may be used to attach the strap to the main component of the anchoring assembly as available to one skilled in the art.

In a first implementation, connectors are used to provide anchorage to a lifting accessory of the lifting device. Connectors may include various types of hooks and bolts, such as a C-shaped hook (10) (as seen on FIG. 4), a D-shaped hook (10) (as seen on FIG. 7) It would be readily understood that the connector may be easily adapted to the lifting accessory and vice-versa.

It should be noted that the main component can have various shapes to accommodate the vessel geometry and to offer an adequate surface to support the connector of the anchor.

Figure 7:
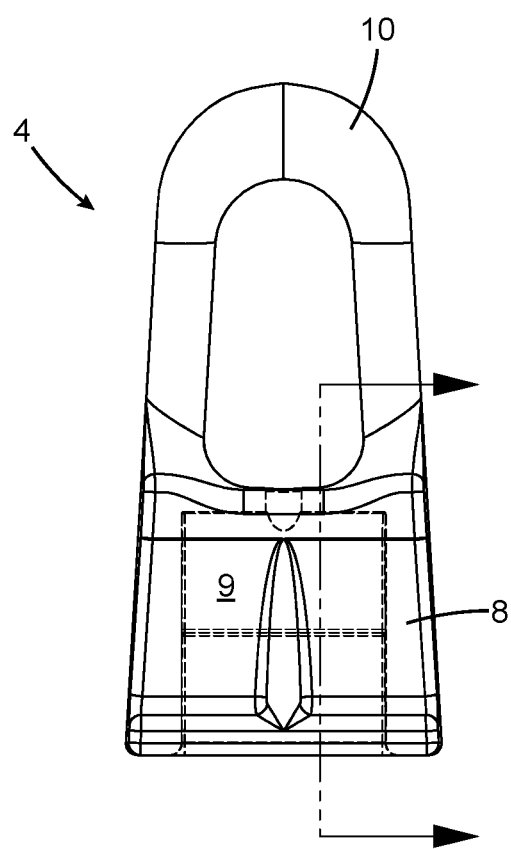
FIG. 7 is a cross-sectional view of an anchor from an anchor assembly including a D-shaped hook and a strap slot.
Figure 8:
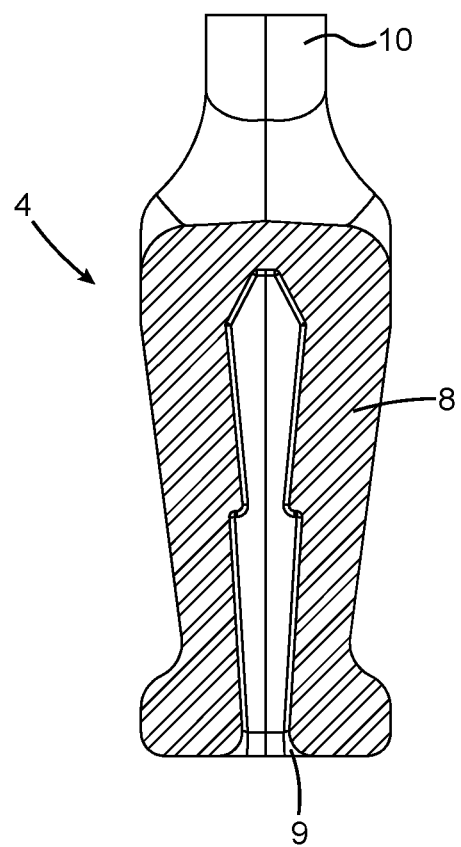
FIG. 8 is a cross-sectional view of the anchor of FIG. 7.
Figure 9:
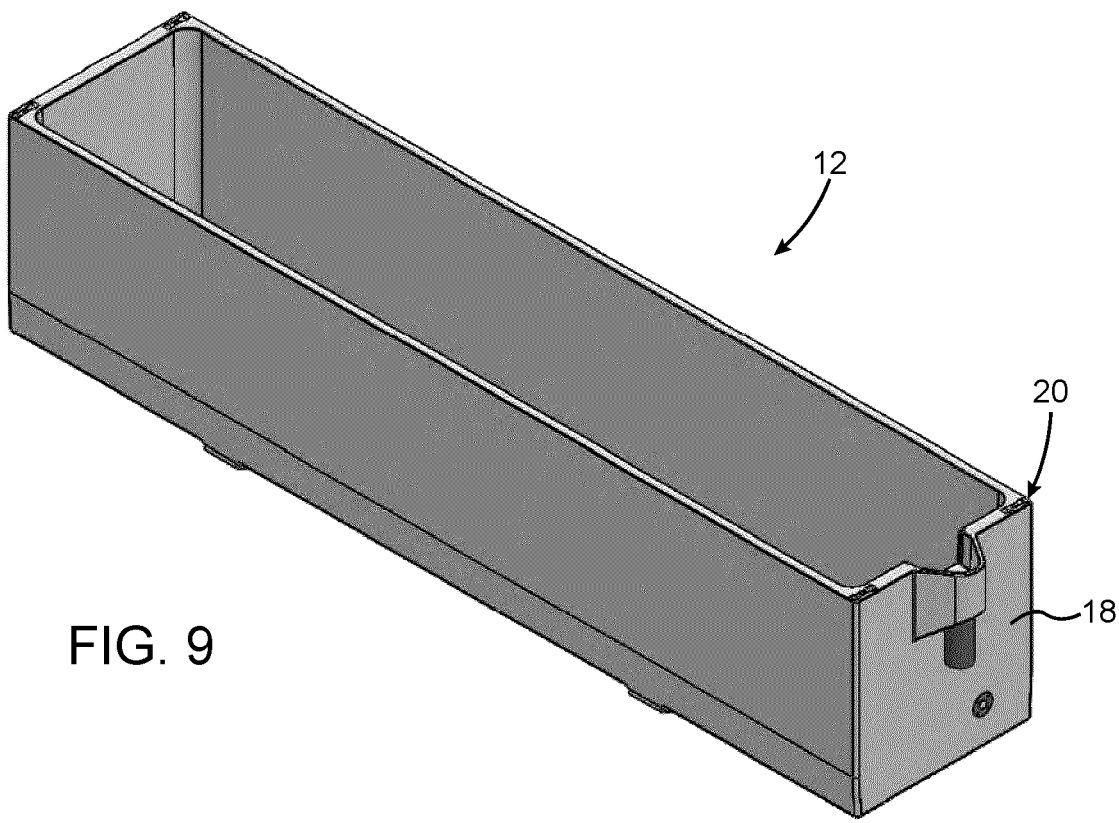
FIG. 9 is a perspective view of an electrolytic vessel having two embedded anchor assemblies distributed vertically in each of two opposed walls of the vessel.

In some implementations, the connector of the anchor (4) may be a hook (10) protruding from the main component (8) as seen on FIGS. 4 and 7 for example. The main component (8) can have a substantially parallelepiped shape to serve as a base for a proximal end of the hook (10). A distal end of the hook (10) can be shaped as a C (FIG. 4) or as a D (FIG. 7) to offer anchorage to a loop such as found in a chain or another complementary hook from the lifting device.

In other implementations, the connector of the anchor (4) may include at least one channel that can be threaded to engage lifting elements via screwing. The number of connectors can be chosen according to the strength desired for the anchorage with the complementary accessory of the lifting device.

Figure 12:
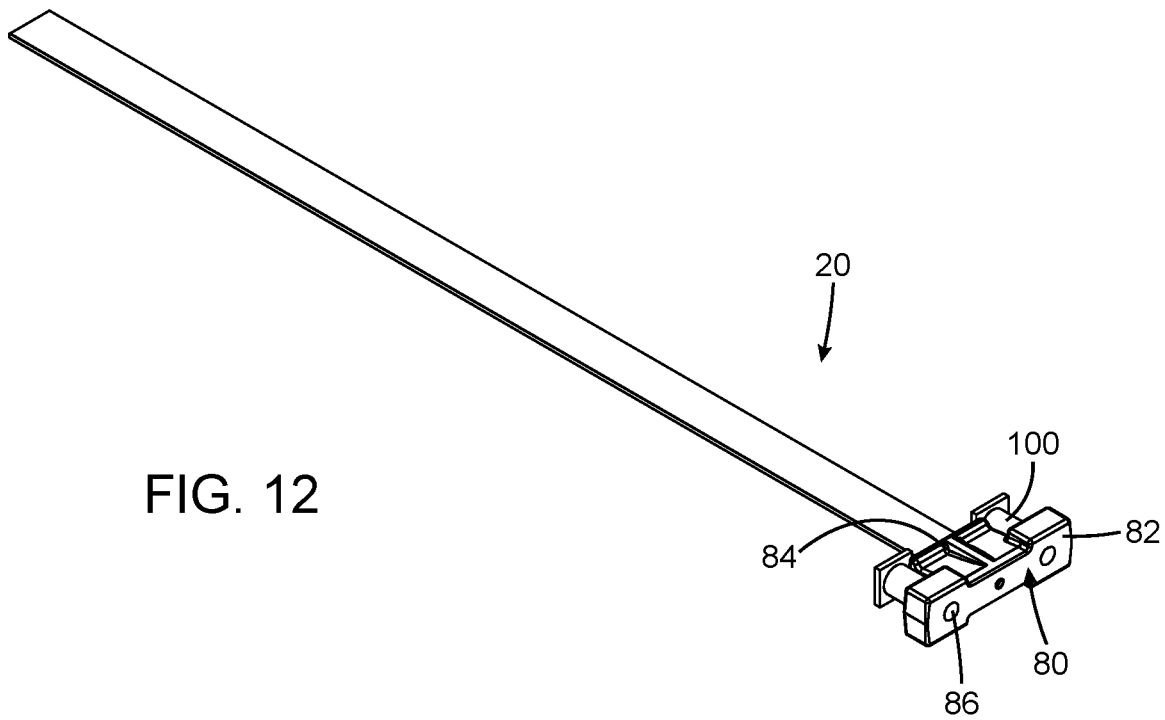
FIG. 12 is a perspective view of the anchor assembly embedded in the vessel of FIG. 9.
Figure 13:
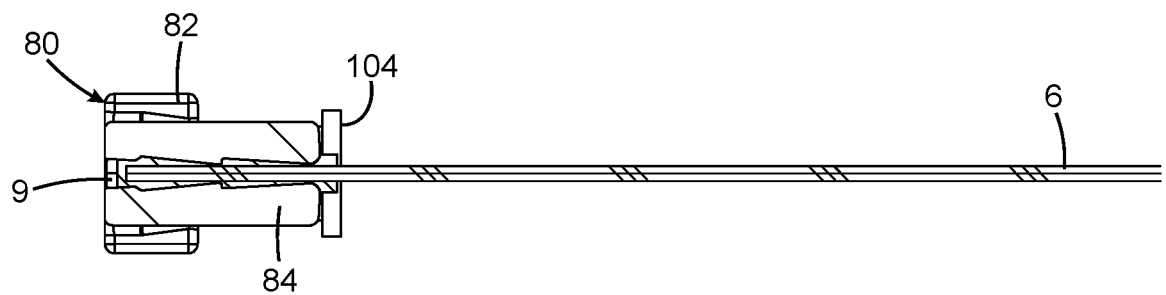
FIG. 13 is a cross-sectional view of a portion of the anchor assembly of FIG. 12.
Figure 14:
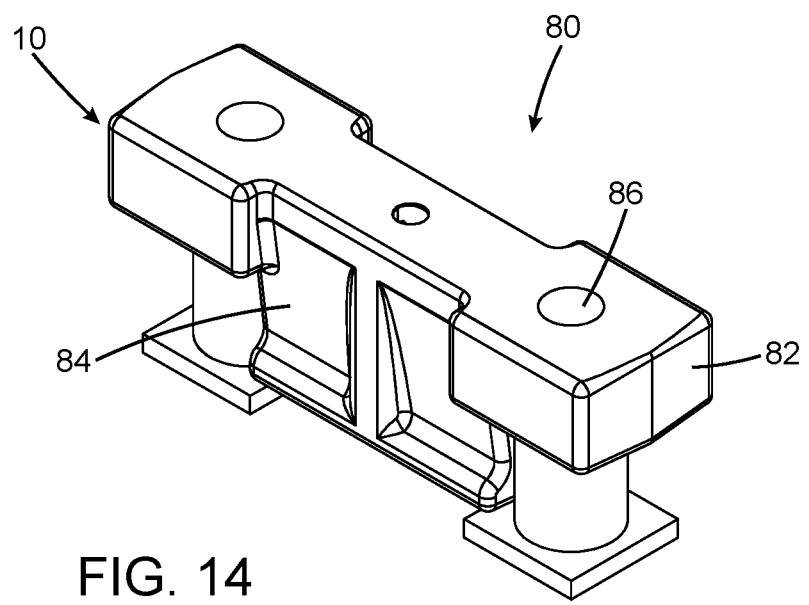
FIG. 14 is a perspective view of a main component of the anchor from the anchor assembly of FIG. 12.
Figure 15:
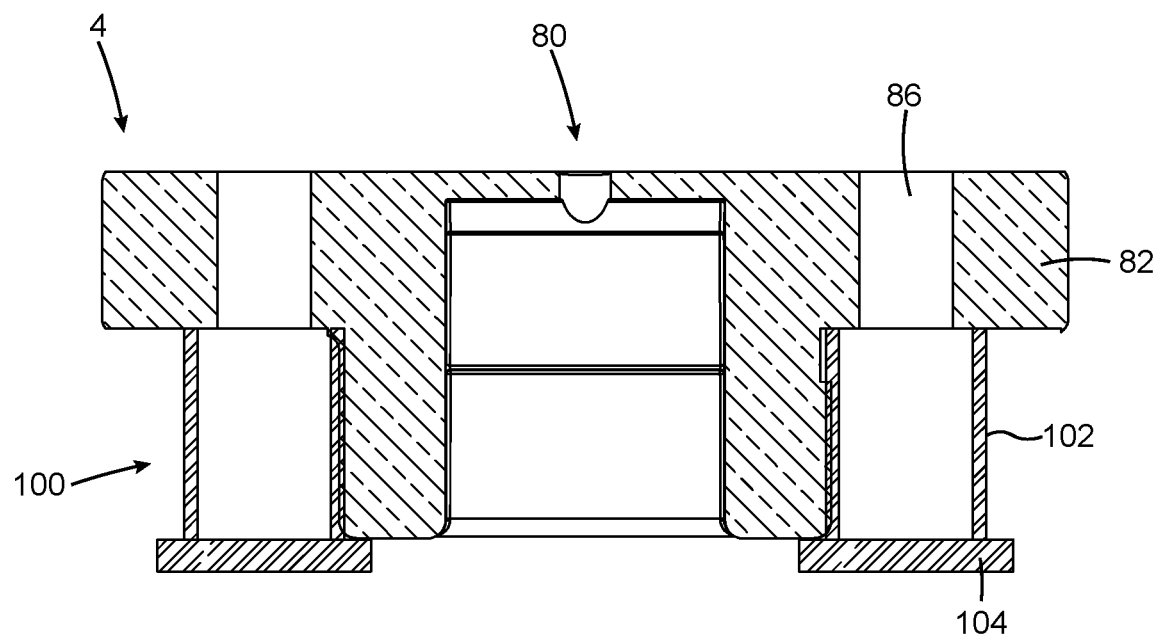
FIG. 15 is a cross-sectional view of the main component of FIG. 14, showing the strap slot and two channels of the anchor assembly of FIG. 12.
Figure 16:
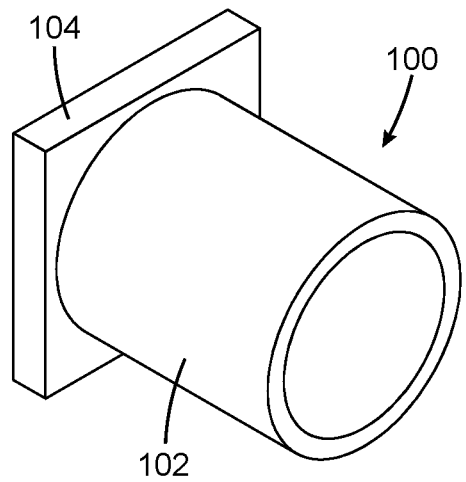
FIG. 16 is a perspective view of a barrel bolt as used in the anchor assembly of FIG. 12.
Figure 17:
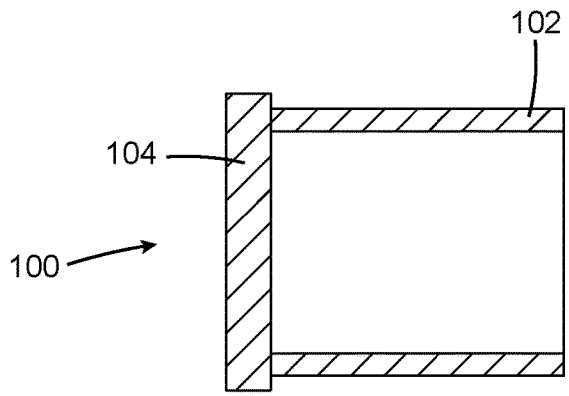
FIG. 17 is a cross-sectional view of the barrel bolt of FIG. 16.

Referring to FIGS. 12, 14 and 15, the main component (80) can include two branch portions (82) serving as the connector (10) of the anchor (4) protruding outwardly from a main portion (84) of the main component (80). Each branch portion (82) includes a channel (86) which diameter is adapted to receive a bolt or screw, thereby securing the vessel to a lifting device.

Referring to FIGS. 12, and 14 to 17, the connector (10) can further include a pair of barrel bolts (100), each barrel bolt (100) being provided at a distal end of the channel (86) to receive and offer abutment to any portion of the screw or bolt (not illustrated) that protrude from the channel after insertion. The barrel bolt (100) is connected, e.g. by welding engagement, to a corresponding branch portion (82) of the main component (80) so as to be substantially aligned with the channel (86). As seen on FIGS. 16 and 17, the barrel bolt (100) includes a threaded barrel (102) and a distal plate (104), mounted on a distal end of the threaded barrel (102) for offering abutment to a mating screw or bolt of a lifting accessory. The proximal end of the threaded barrel (102) can be fixed to the branch portion (82) so as to be aligned with the channel (86).

Figure 30:
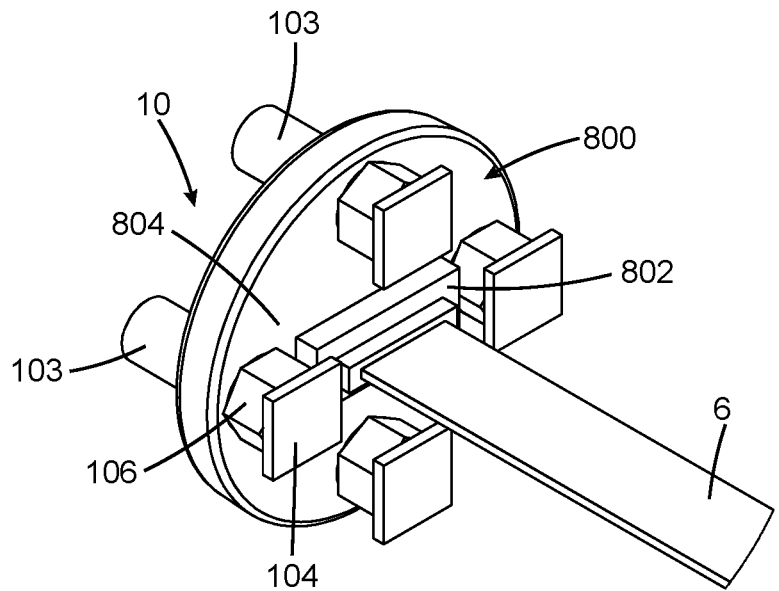
FIG. 30 is a perspective rear view of a portion of the anchor assembly of FIG. 29.
Figure 31:
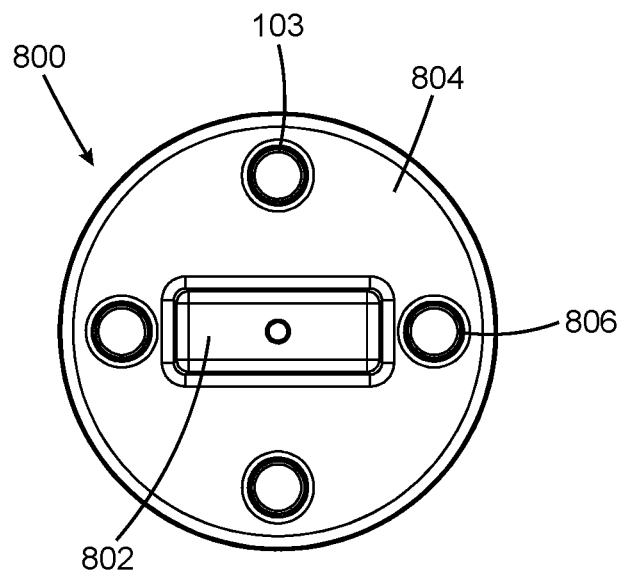
FIG. 31 is a front view of the anchor from the anchor assembly of FIG. 29.
Figure 32:
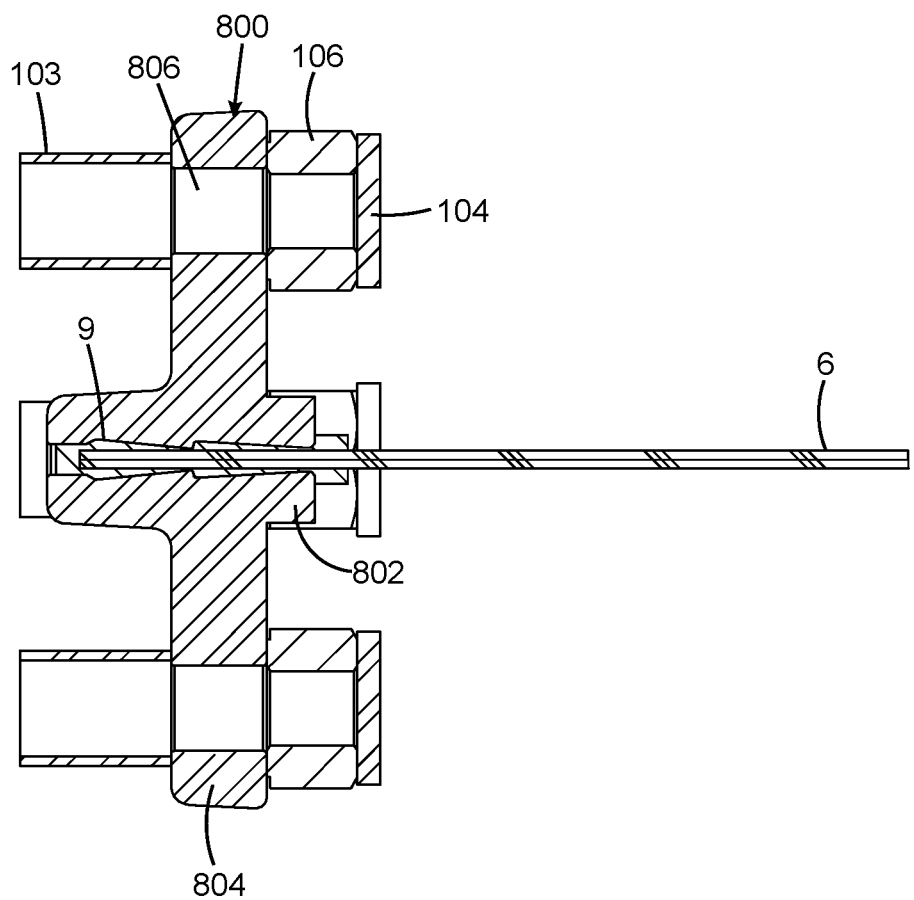
FIG. 32 is a cross-sectional side view of the portion of anchor assembly of FIG. 30.

FIGS. 30 to 32 show another implementation of a main component (800) being made of a rectangular base (802) enclosing the strap slot, and a circular distal plate (804) protruding radially from a distal end of the base (802). The distal plate (804) includes four channels (806), each channel (806) having a diameter adapted to cooperate at a proximal end thereof with a barrel (103) and at a distal end thereof with a nut (106). Length of the barrel (103) may be varied and adapted to the thickness of the vessel wall to offer access from an outside surface of the vessel wall for securing a mating screw (not illustrated). The distal plate (104) may be used in connection with the nut to offer abutment to the mating screw and avoid pressure and cracks in the core of the vessel. As seen on FIGS. 35 to 37, the distal plate (804) of the main component (800) may be shaped differently such as an oval. Again, a change in the shape of the distal plate may be for example needed to be in accordance with a thickness of the wall of the vessel in which the strap and anchor may be embedded.

Figure 6:
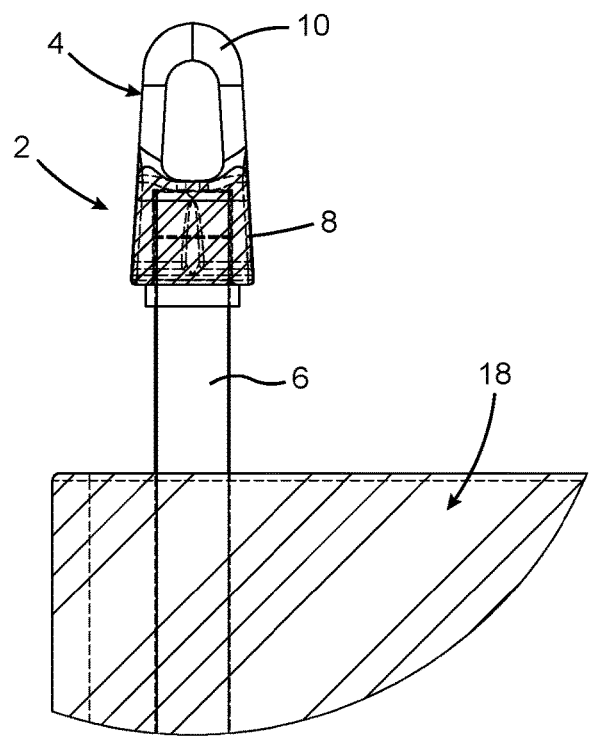
FIG. 6 is a transparent cross-sectional view of a portion of an electrolytic vessel showing a protruding D-shaped hook from an anchor assembly.

As seen on FIGS. 20, 29, 34, 40, 46 and 57, the main component (80, 800, 808) may be connected to each of the two ends of the strap (6); or the main component (8, 80) may be connected to only one end of the strap (6), as seen on FIGS. 4, 6 and 12. A same main component (80, 800, 808) may be connected to both ends of the strap (6) (as seen on FIGS. 20, 29, 34, 40 and 46), or different main components (80 and 808) may be connected to the two ends of the strap (6) respectively (as seen on FIG. 57). It should be noted that the possible configurations are not limited to the one illustrated in the Figures and other combinations of main component and connectors at each end of the strap could be easily selected by one skilled in the art depending on the functionalities and configuration of the lifting accessory which is used for the lifting.

The main component may be made of galvanized metal, cast iron, stainless steel and other steel alloys, copper, bronze, or aluminium-bronze.

The main component may be made of the same material as the connector. In one embodiment wherein the connector is a hook, the main component and the connector are optionally made as a one-piece structure.

According to some embodiments of the anchor assembly, the main component from one anchor assembly may be connected to the main component from another anchor assembly to further distribute the loads applied to the core walls of the vessel during lifting and displacement. The connection may be performed for example by welding one main component to the other. Alternatively, chemical fixation or any other suitable means available may be used to connect to the main components together according to their material.

Figure 54:
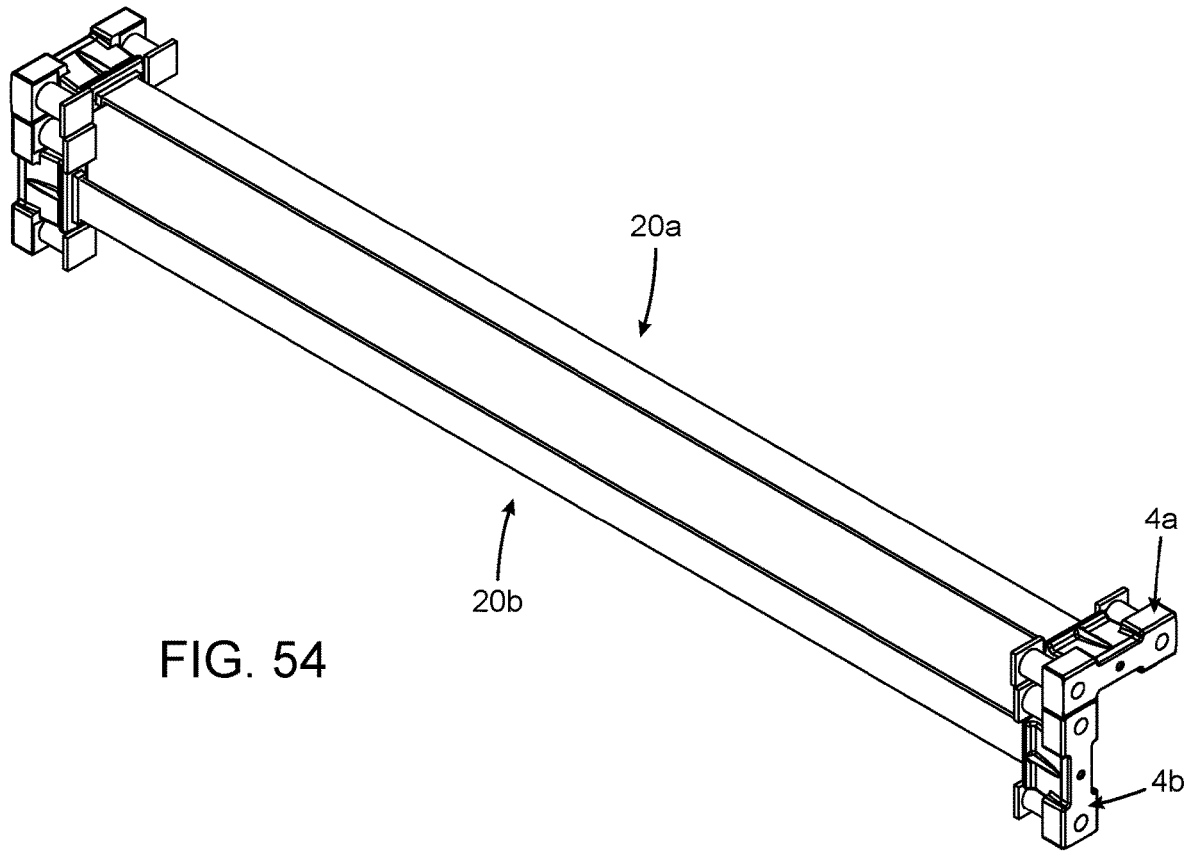
FIG. 54 is a perspective view of two anchor assemblies from the vessel of FIG. 52 which are welded together by their main components.
Figure 55:
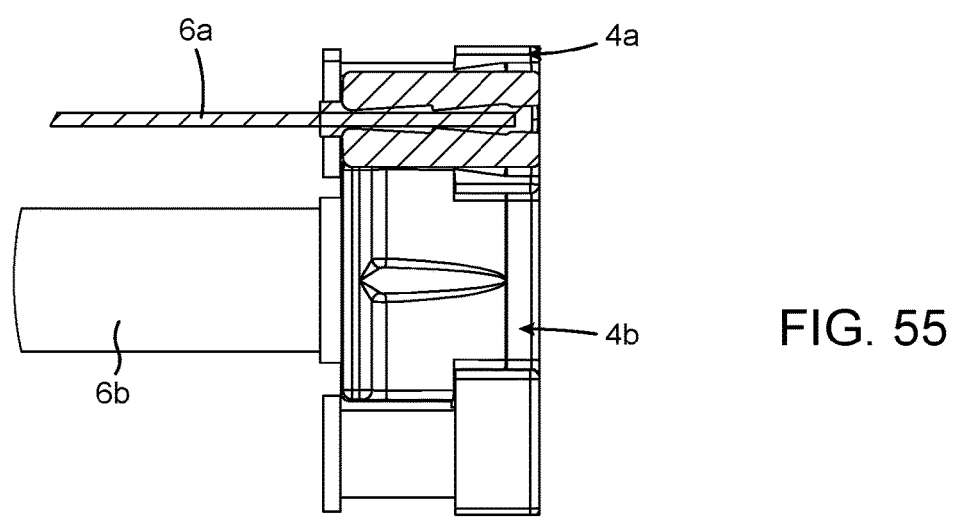
FIG. 55 is a cross-sectional side view of two main components of FIG. 54.
Figure 56:
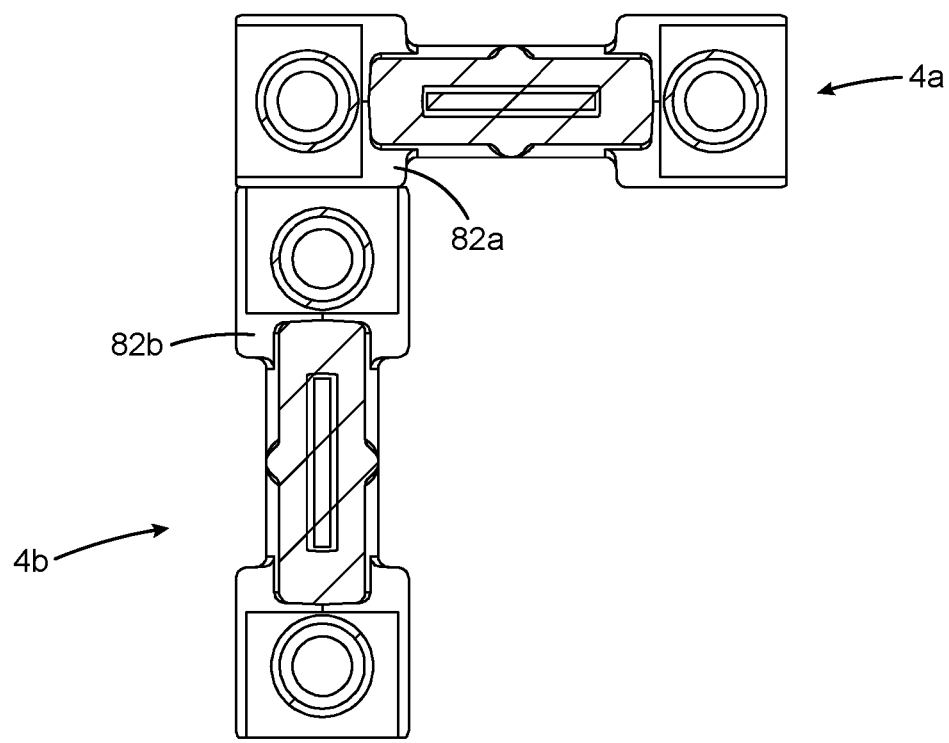
FIG. 56 is a cross-sectional front view of two main components of FIG. 54.
Figure 57:
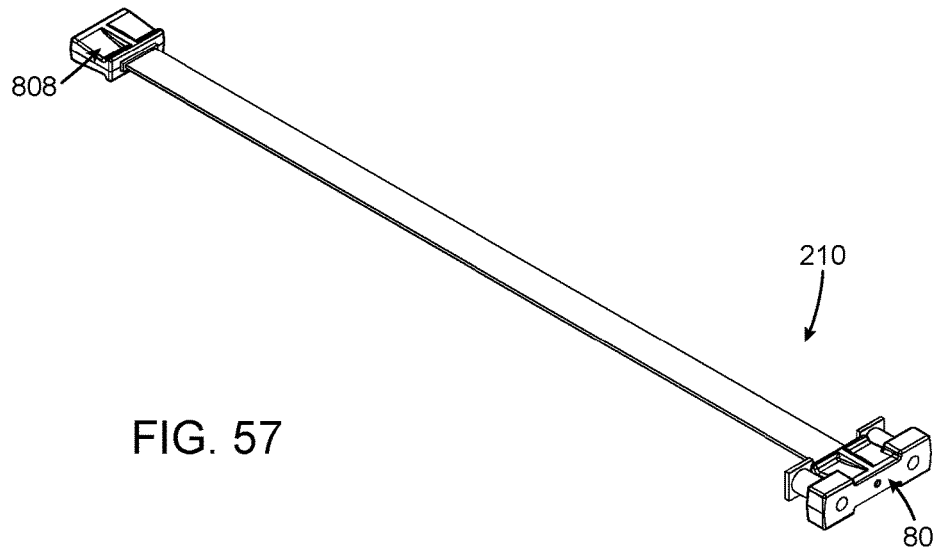
FIG. 57 is a perspective view of another anchor assembly.
Figure 58:
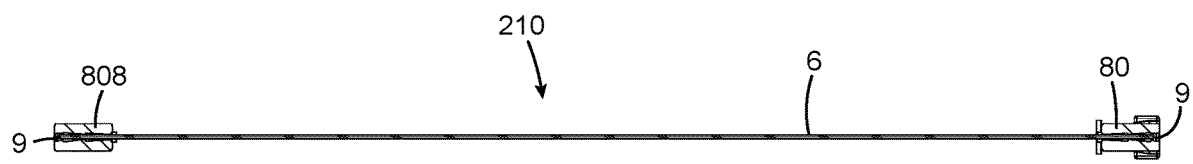
FIG. 58 is a cross-sectional side view of the anchor assembly of FIG. 57.

For example, referring to FIG. 56, a branch portion (82a) of a first main component (82a) of a first anchor assembly (20a) can be welded to another branch portion (82b) of a second main component (82b) of the second anchor assembly (20b) such that the first and second anchors (4a and 4b) are connected together at a 90-degree angle and the two straps (6a, 6b) extends along each other in parallel relationship, thereby resulting in the anchor assembly illustrated in FIG. 54.

Figure 46:
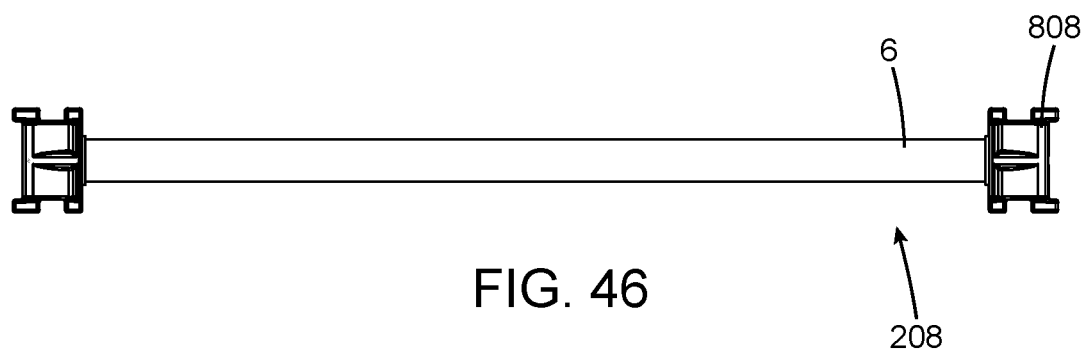
FIG. 46 is an upper view of the joining assembly embedded in the vessel of FIG. 42.
Figure 47:
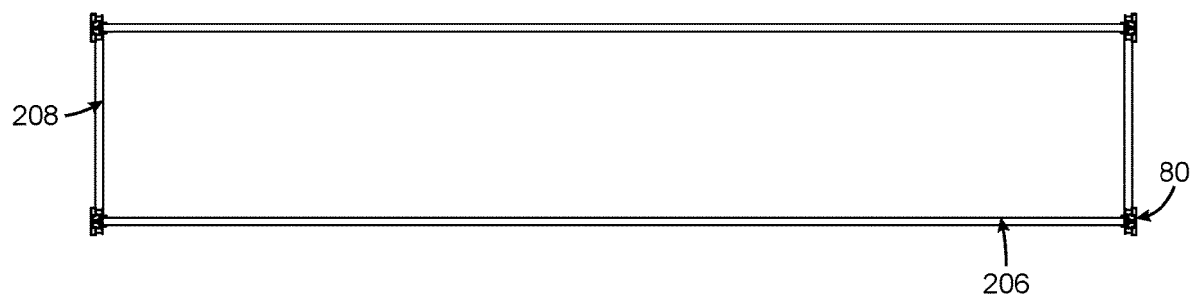
FIG. 47 is an upper view of a reinforcing web formed by the joining assemblies and the anchor assemblies embedded in the vessel of FIG. 42.
Figure 48:
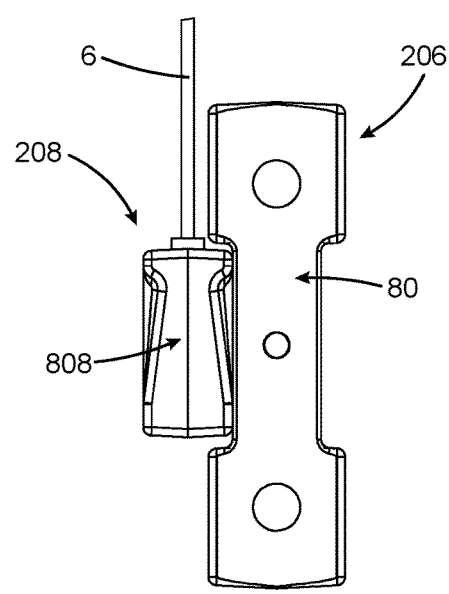
FIG. 48 is a front view of the connected main components of the respective joining assembly and anchor assembly of FIG. 45.

In another example, several anchor assemblies may be connected to one another to create a reinforcing web within the vessel walls. Anchor assemblies used to join other anchor assemblies can be referred to as joining assemblies. Referring to FIGS. 47 and 48, each main component (808) of a pair of joining assemblies (208) is connected with a main component (80) of another pair of anchor assemblies (206), such that the four corresponding straps (6) of the anchor/joining assemblies (206, 208) defined a rectangular web. It should be noted that a main component may not be coupled with connectors and provided at both ends of a strap, the resulting assembly being used to connect two anchor assemblies together such as seen in FIG. 47. Indeed, the main components (808) of the joining assembly (208) illustrated in FIG. 46 are not configured to receive connectors, and the resulting joining assembly (208) may be therefore used to join two other anchor assemblies together, and form the rectangular web.

As mentioned above, various combinations of anchor assemblies may be envisaged according to the rigging configuration needed. For example, referring to the anchor assembly (210) from FIGS. 57 and 58, the proximal main component (808) connected to a proximal end of the strap (6) may be connected to a main component of another anchor assembly (not illustrated in the Figures), and the distal main component (80) connected at a distal end of the strap (6) cooperate with a pair of connectors to provide anchorage for lifting. For example, the proximal main component could be connected to a main component of another assembly such that the two straps extend with respect to one another at a 90-degree angle (not illustrated in the Figures).

It should be noted that the process used to connect two main components and the specific location of this connection should be properly selected depending on the chemical used for fixation of the strap into the main component. For example, heating the metal of the two main components to be connected to a high temperature could weaken the chemical fixation of the strap with its main component. Therefore, a first main component may be connected to a second main component at a connection location as far away as possible from the strap slot.

More details about possible configurations will be provided further below in relation to the electrolytic vessel implementations.

Electrolytic Vessel Implementations

Figure 3:
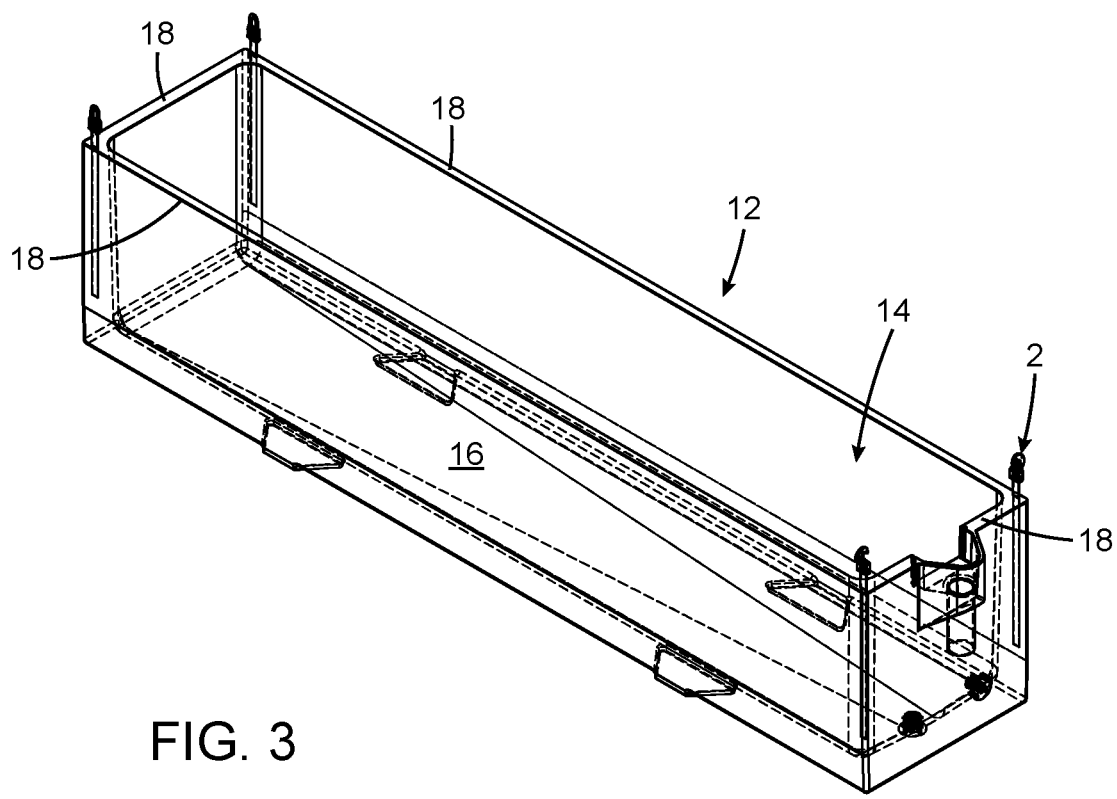
FIG. 3 is a transparent perspective view of the vessel of FIG. 2.

Referring to FIG. 3, an electrolytic vessel (12) includes a core (14) having a core base (16), optionally rectangular, and four walls (18) extending from peripheral edges of the core base (16) (may be referred to herein to two side walls, a front wall and a rear wall). The core defines a cavity in which an electrolytic liquid or bath can be received. Optionally, the core (14) may be made of polymer concrete or prestressed polymer concrete. It should be understood that an inner surface of the core (14) corresponds to the combination of an inner surface of the core walls (18) and a top surface of the core base (16). An outer surface of the core (14) corresponds to the combination of a remaining external surface of the core walls (18) and a bottom surface of the core base (16).

Number and location of the anchor and joining assemblies within the core walls of the vessel may be chosen to account for applied loads which are expected during the hydrometallurgical operation, lifting, transport and placement of the vessel, and especially according to the rigging configuration desired for the lifting phase. A person skilled in the art will readily understand that, to provide balance during lifting, at least one anchor assembly should be provided within each of two opposed core walls of a vessel. It should further be noted that a symmetrical configuration for the distribution of the anchor assemblies within the core walls should be privileged.

Figure 10:
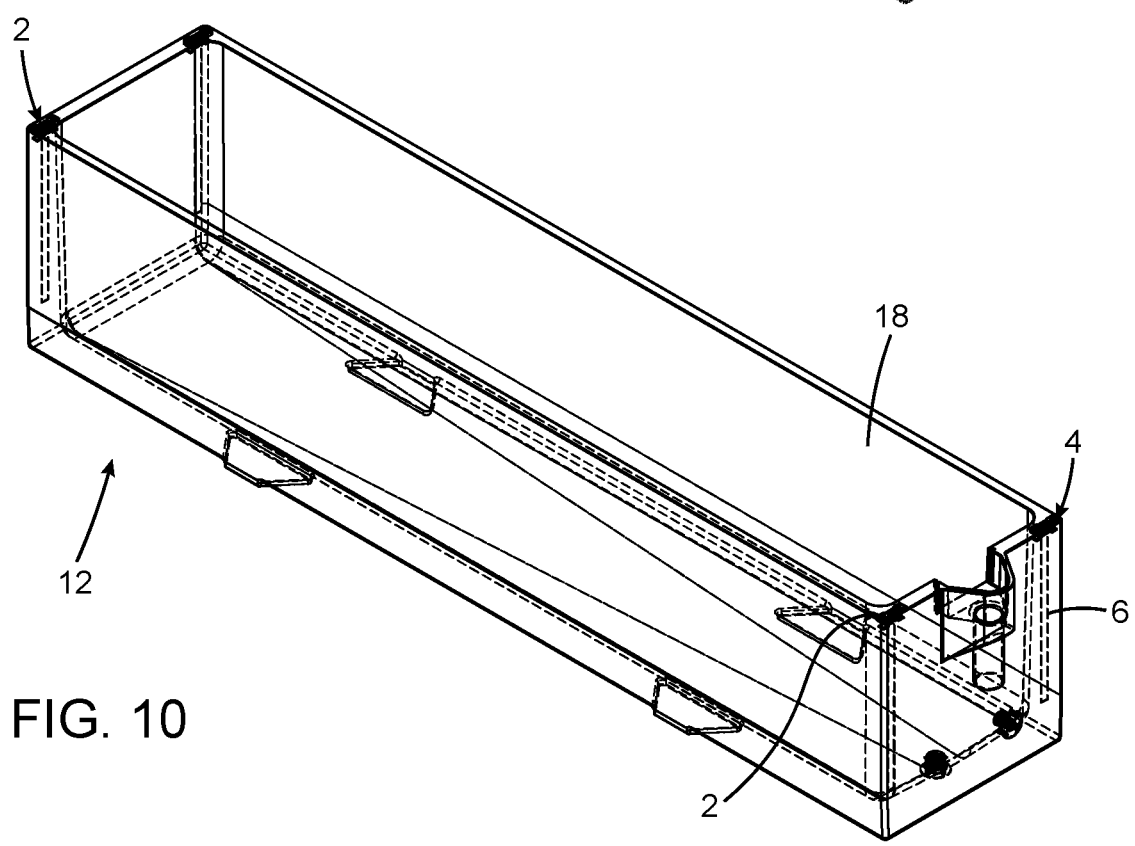
FIG. 10 is transparent perspective view of the electrolytic vessel of FIG. 9.
Figure 27:
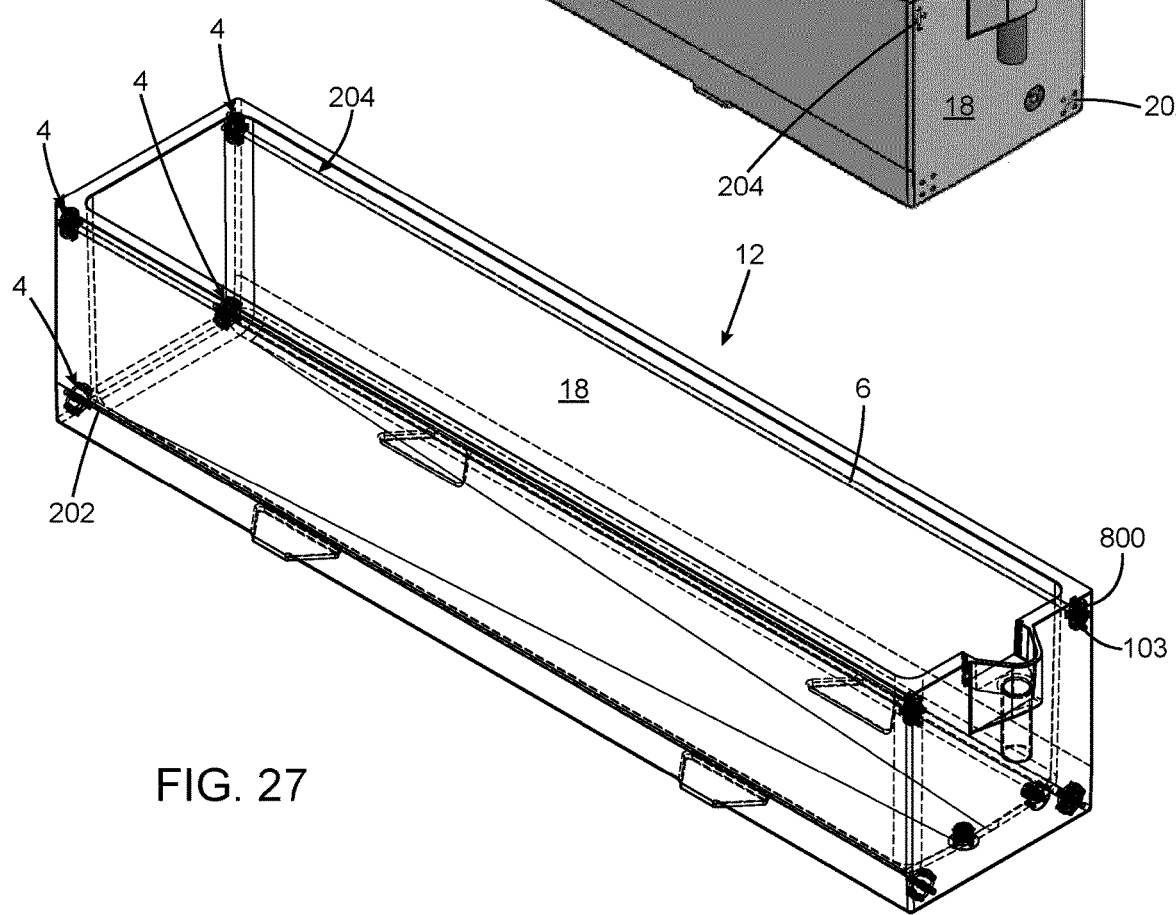
FIG. 27 is transparent perspective view of the vessel of FIG. 26.
Figure 28:
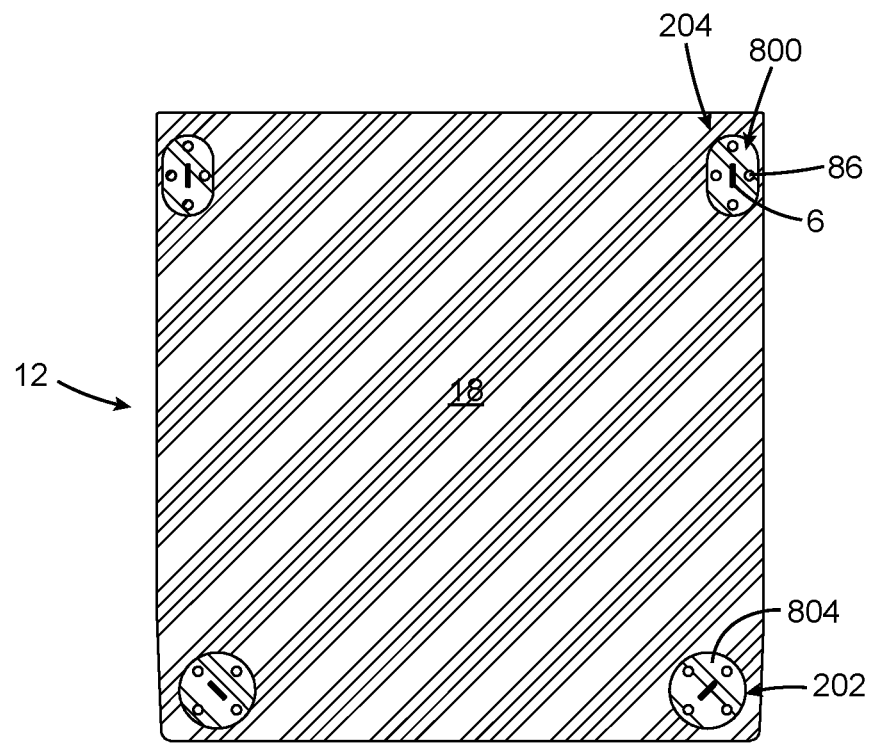
FIG. 28 is a cross-sectional view of a front wall of vessel of FIG. 26.
Figure 29:
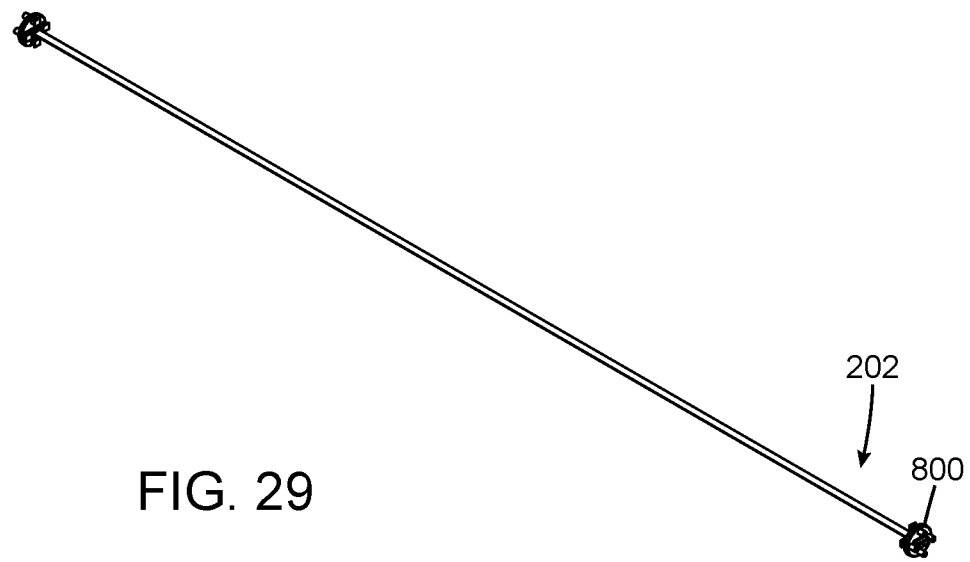
FIG. 29 is a perspective view of an anchor assembly embedded within the vessel of FIG. 26.
Figure 39:
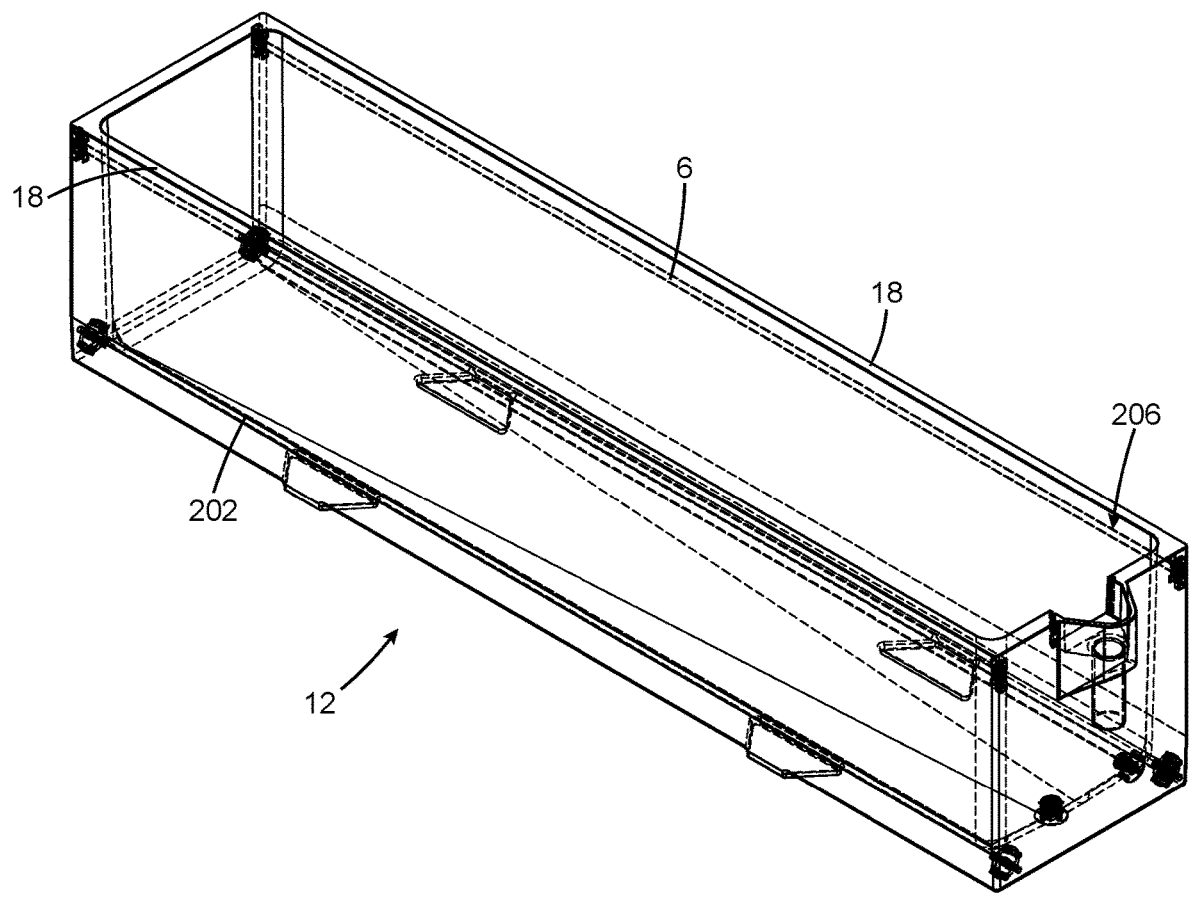
FIG. 39 is a transparent perspective view of an electrolytic vessel having two other embedded anchor assemblies, including two anchors for one strap, distributed horizontally in each of two opposed side walls of the vessel.
Figure 40:
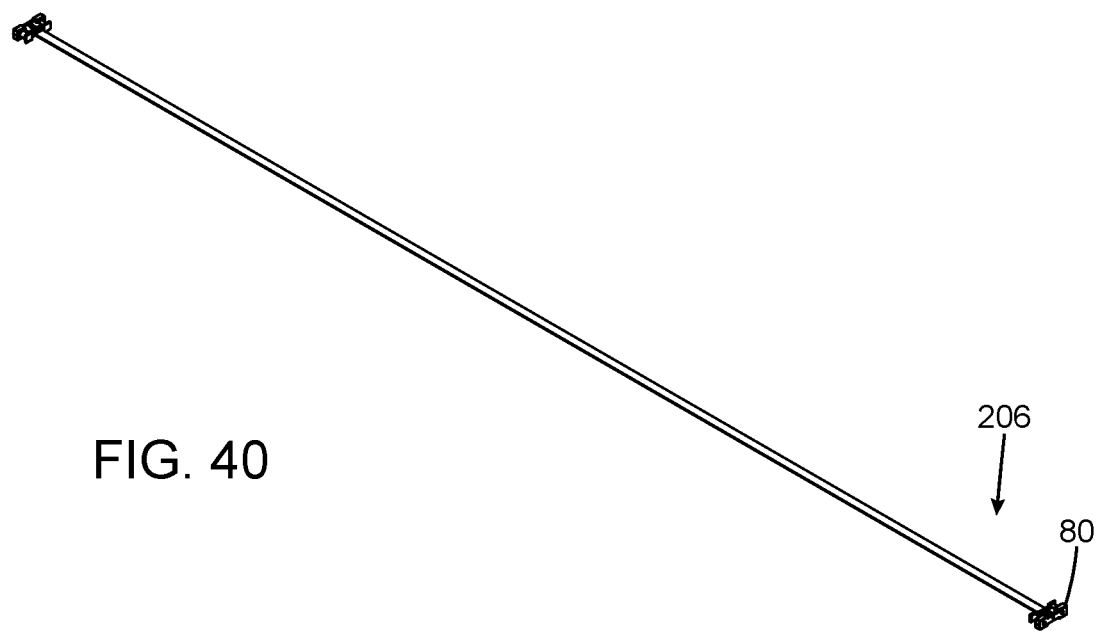
FIG. 40 is a perspective view of one anchor assembly embedded in the vessel of FIG. 39.
Figure 41:
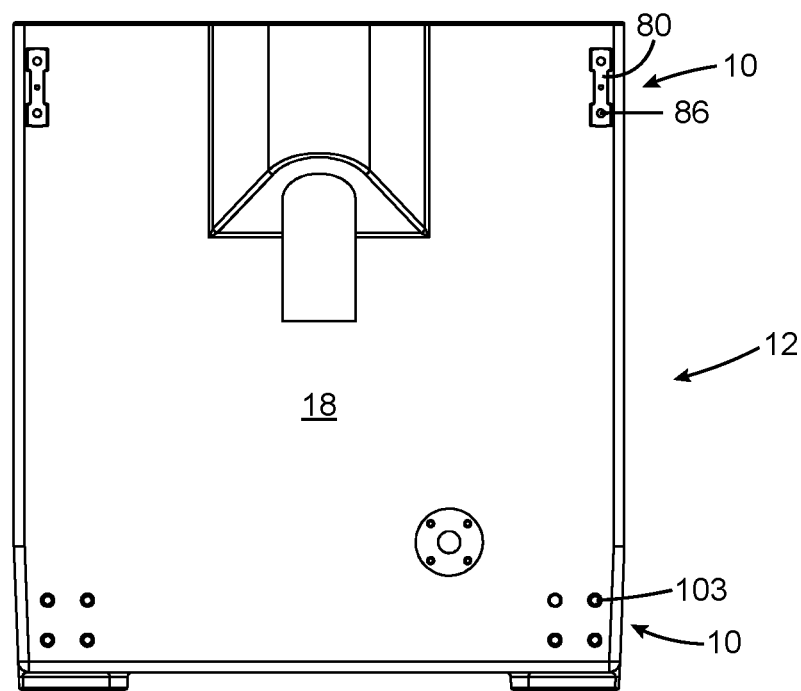
FIG. 41 is a front view of the vessel of FIG. 40 showing two different pairs of connectors distributed symmetrically in an upper portion and a lower portion of a front wall.
Figure 42:
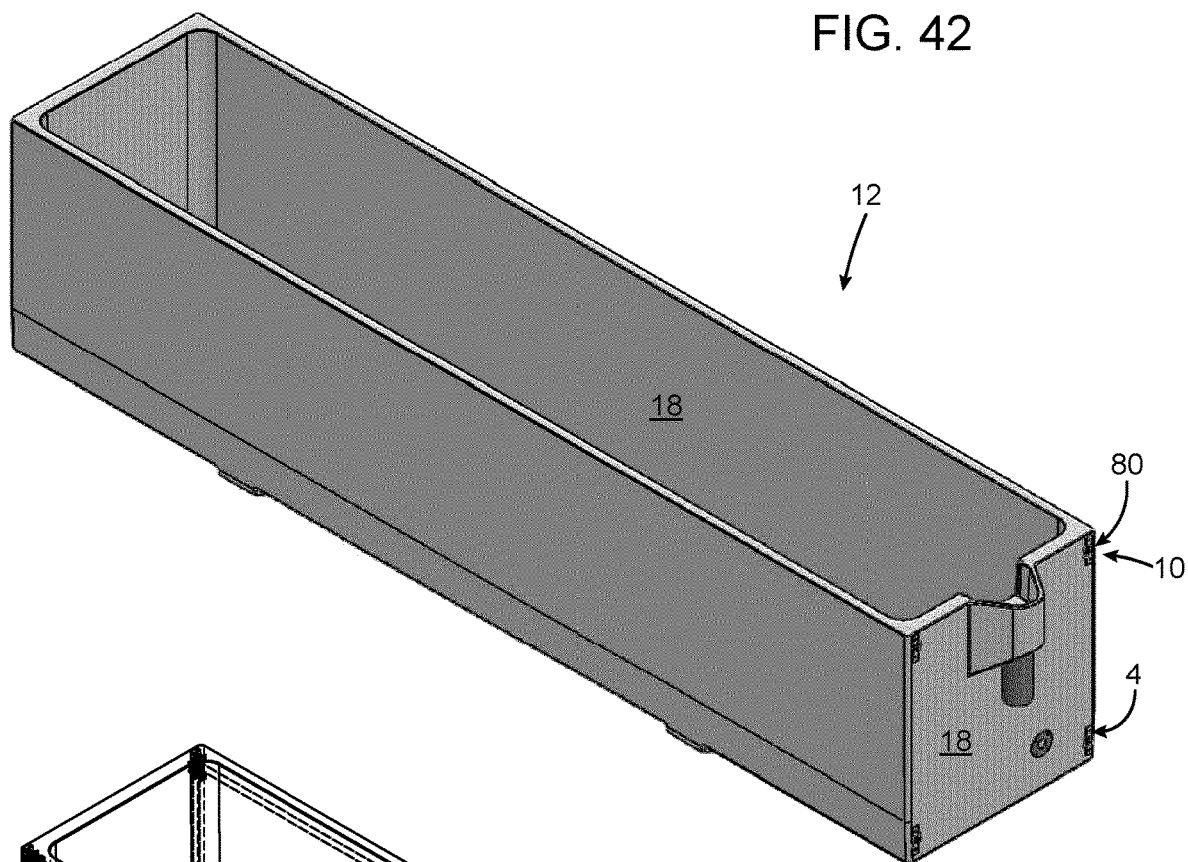
FIG. 42 is a perspective view of an electrolytic vessel having two embedded anchor assemblies, including two anchors for one strap, distributed horizontally in each of two opposed side walls of the vessel, and two joining assemblies distributed vertically in each of the two opposed front and rear walls of the vessel.
Figure 43:
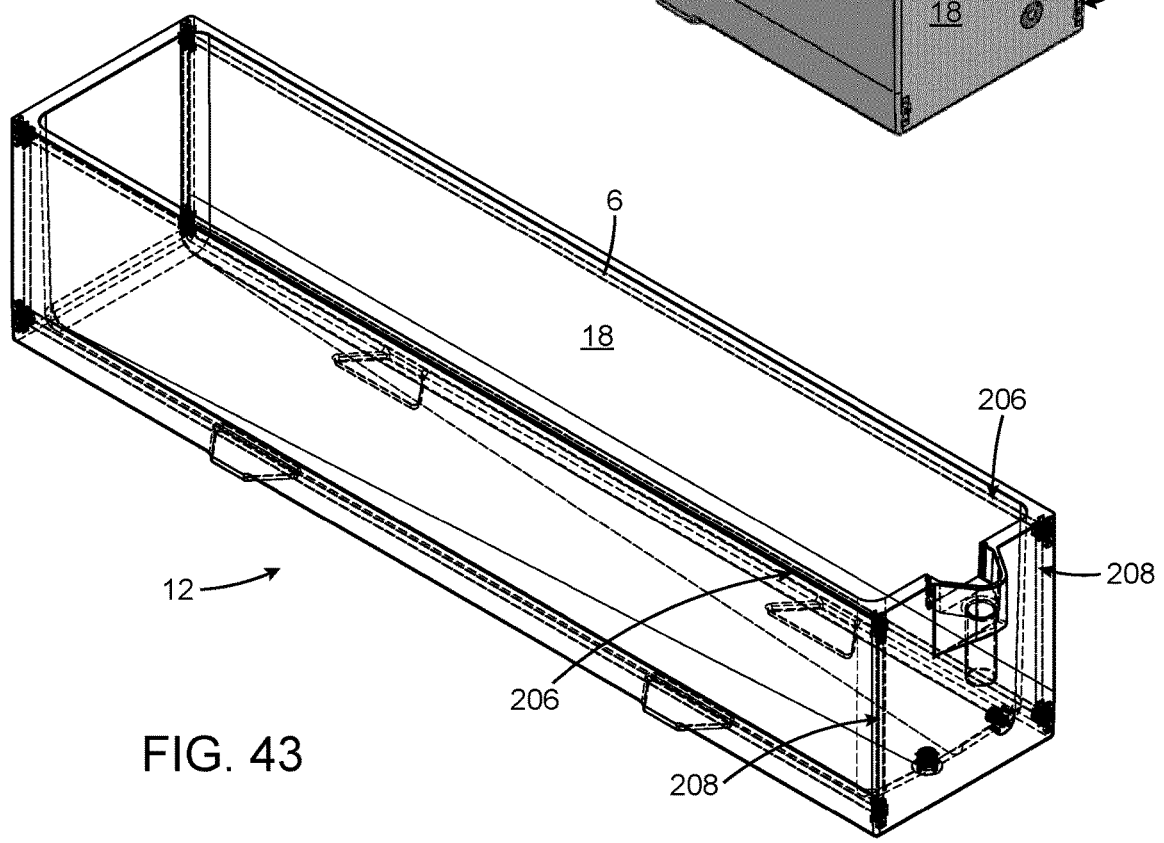
FIG. 43 is a perspective view of the vessel of FIG. 42.

At least a portion of the strap of each anchor assembly is embedded within a core wall of the electrolytic vessel so as to absorb and distribute dynamic loads applied to the vessel during hydrometallurgical operation, lifting, transport and placement, thereby avoiding cracking of the core wall. One or more straps (6) may extend substantially vertically from an upper edge of a core wall (18) towards the core base (16) as seen on FIGS. 3, 10, 18, or extend substantially horizontally from a side edge of the core wall (18) towards an opposed side edge of the same core wall (18) as seen on FIGS. 22, 27, 39. Optionally, a plurality of straps (6) may extend vertically, diagonally and horizontally within a core wall (18) so as to define a reinforcing web as seen on FIG. 43, 49, 50.

Figure 2:
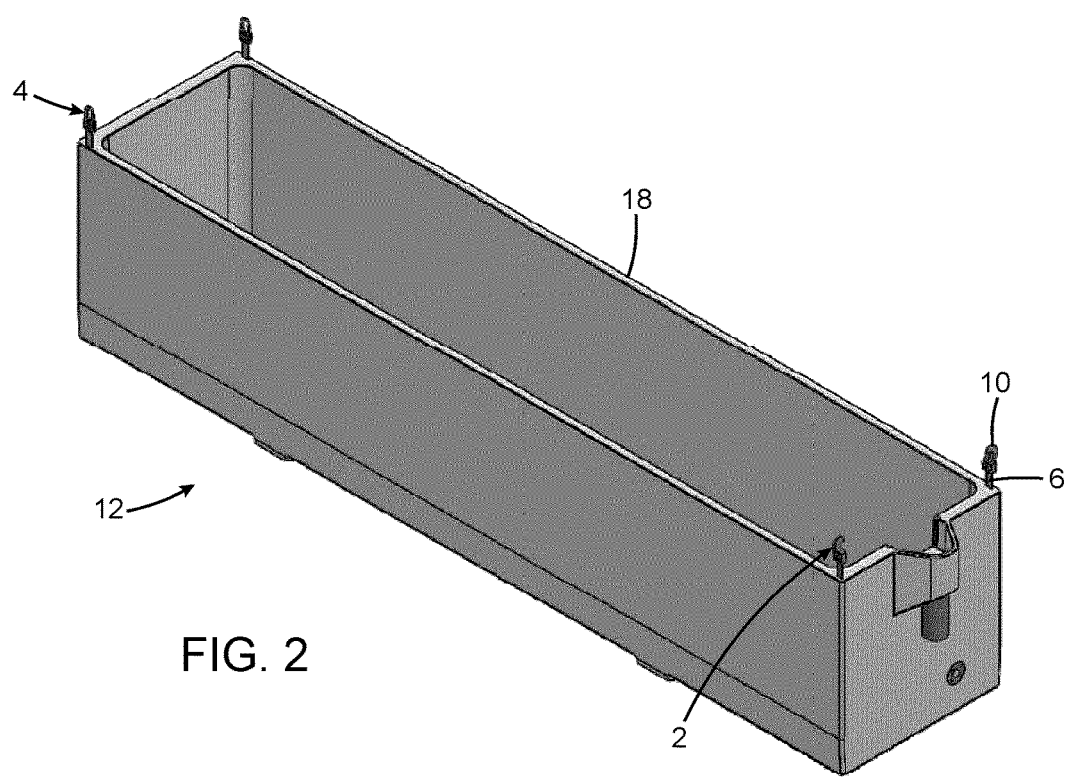
FIG. 2 is a perspective view of an electrolytic vessel having two embedded anchor assemblies, including protruding C-shaped hooks, distributed vertically in each of two opposed walls of the vessel.

Optionally, the anchor (4) may protrude from edges of the core walls (18) as seen on FIGS. 2, 3 and 6, or may be embedded within the core walls (18) as seen on FIGS. 10, 18, 22, 27, 39, 43 and 53.

Figure 11:
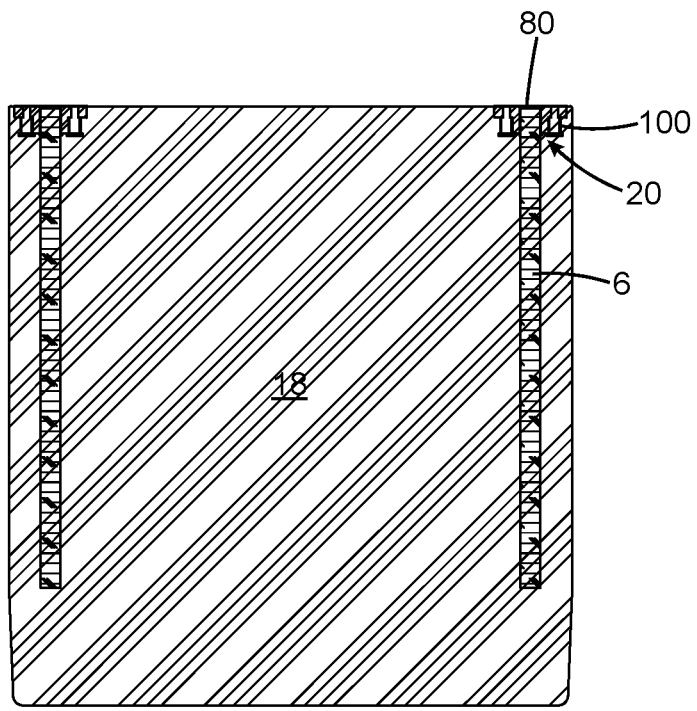
FIG. 11 is a cross-sectional view of a wall of the vessel of FIG. 9 including the two anchor assemblies.
Figure 60:
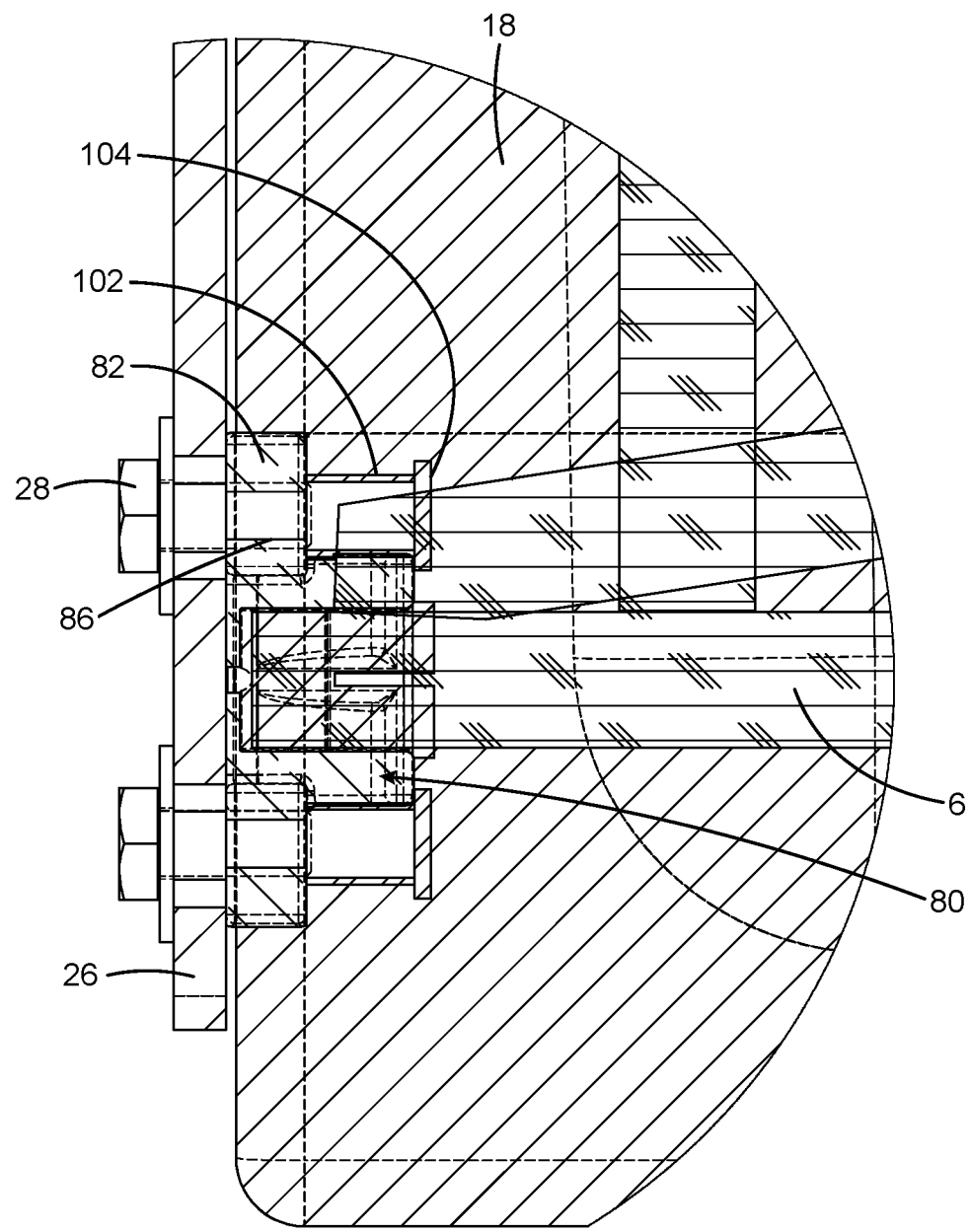
FIG. 60 is a cross-sectional right side view of a bottom left corner portion of the vessel FIG. 59 showing a portion of a lifting plate which is secured to the main component of an anchor assembly embedded in the vessel, via a pair of screws.

In the vessel embodiment shown in FIGS. 2 and 3, two anchor assemblies (2) are embedded within each of two opposed core walls (18). A main portion of the strap (6) is embedded within the core wall (18), such that the anchor (4), including the connector (10) being a hook, is apparent from an upper edge of the core wall (18) and readily connectable to a lifting accessory of the lifting device. The two anchor assemblies (2) may be extending vertically and distributed symmetrically within the same core wall, being preferably located proximate to side edges of the core wall (18). Such anchor assembly configurations are suited when using complementary hooks and chains connected to the overhead crane for lifting the vessel (12), as schematically represented in FIG. 60, In the vessel embodiment shown in FIGS. 10 and 11, two anchor assemblies (20) are embedded within each of two opposed core walls (18). Both anchor (4) and strap (6) are embedded within the core wall (18), such that at least the connectors of the assembly (20) are apparent from an upper edge of the core wall (18) and readily connectable to a lifting accessory of the lifting device. The two anchor assemblies (20) may be extending vertically and distributed symmetrically within the same core wall, being preferably located proximate to side edges of the core wall (18).

Figure 18:
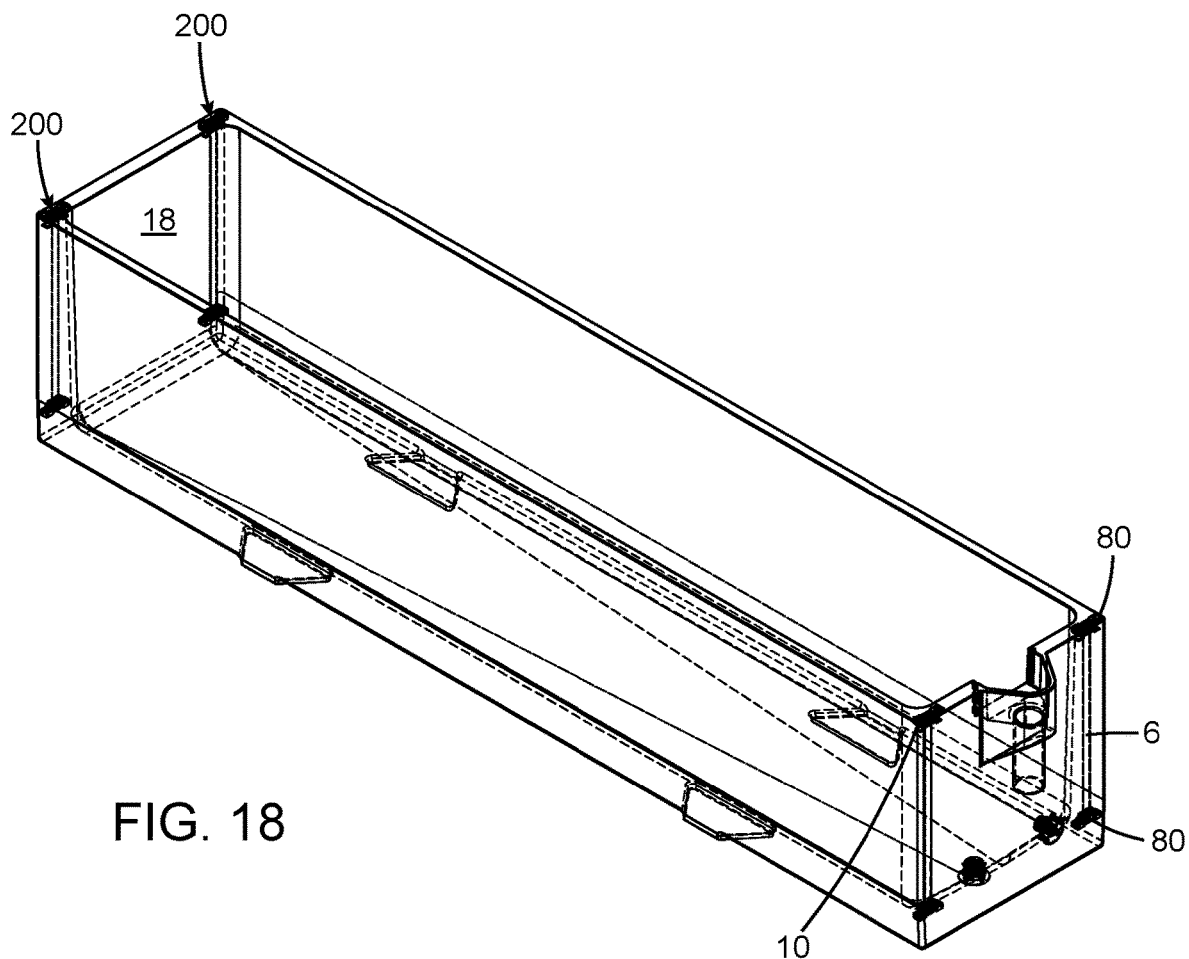
FIG. 18 is a transparent perspective view of an electrolytic vessel having two embedded anchor assemblies, including two anchors for one strap, distributed vertically in each of two opposed walls of the vessel.
Figure 19:
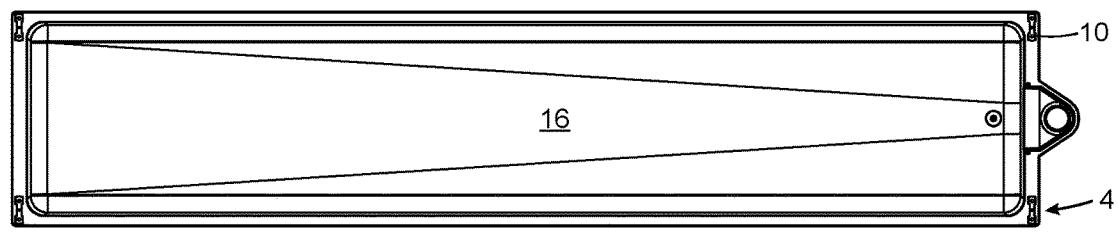
FIG. 19 is a lower view of the electrolytic vessel of FIG. 18 showing apparent anchors at each side of the base of the vessel.
Figure 20:
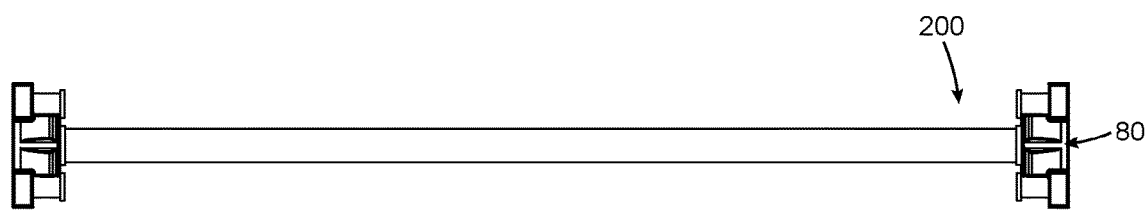
FIG. 20 is an upper view of the anchor assembly used in the electrolytic vessel of FIG. 18.
Figure 21:
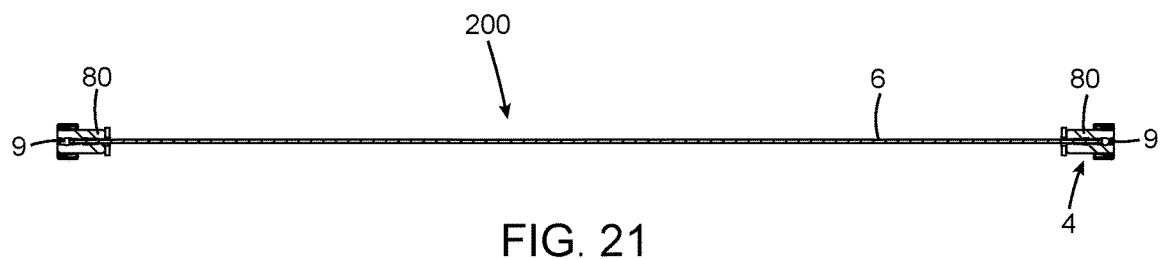
FIG. 21 is a cross-sectional side view of the anchor assembly of FIG. 20.

In another vessel embodiment shown in FIGS. 18 and 19, the two anchor assemblies (200) are extending vertically and distributed symmetrically within the same core wall (18). Differently from FIGS. 10 and 11, an anchor (4) is provided at both ends of each strap (6) such that the channels of the connector (10) can receive the lifting accessory from a bottom surface of the core base (16) and a top external surface of a core wall (18).

Figure 22:
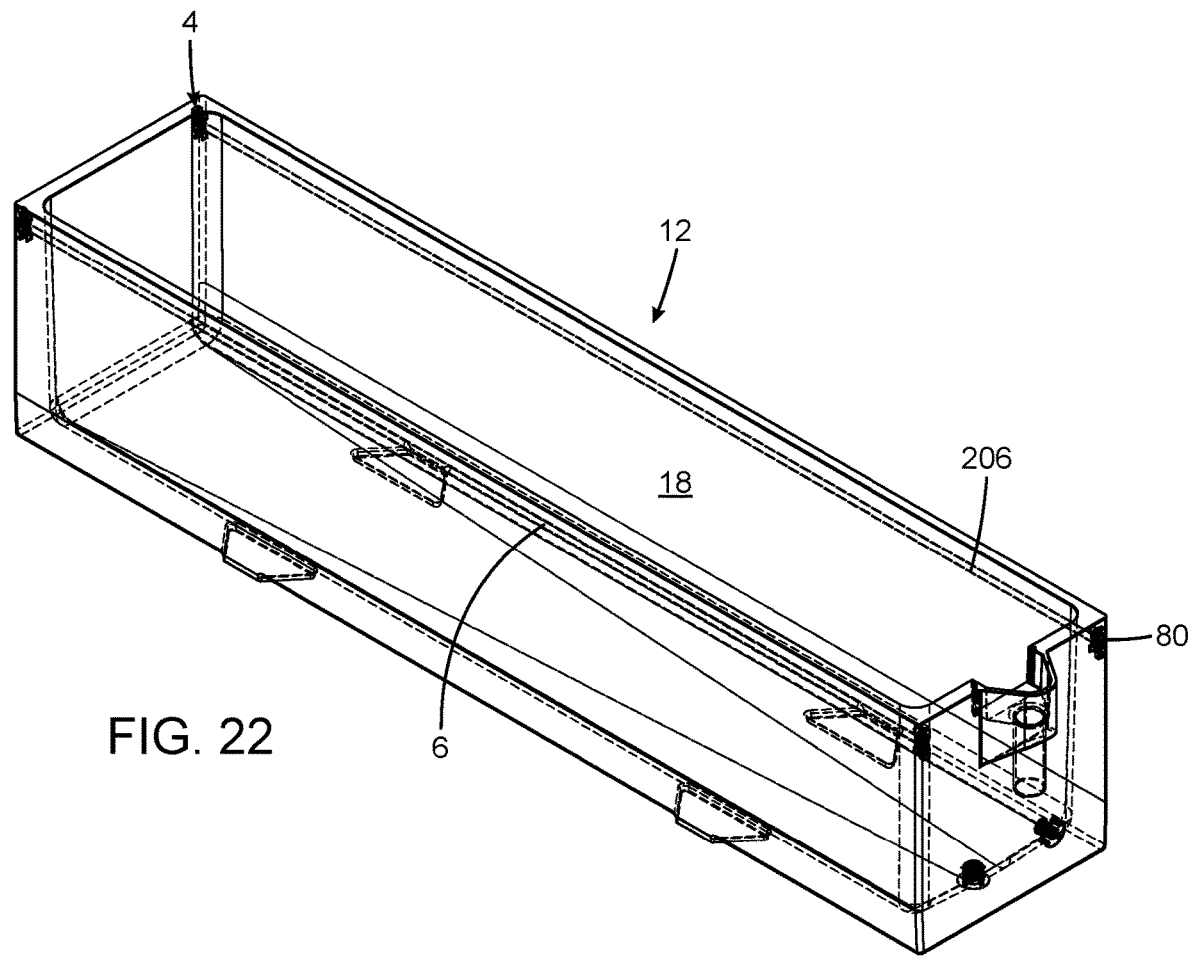
FIG. 22 is a transparent perspective view of an electrolytic vessel having one embedded anchor assembly, including two anchors for one strap, distributed horizontally in each of two opposed side walls of the vessel.
Figure 26:
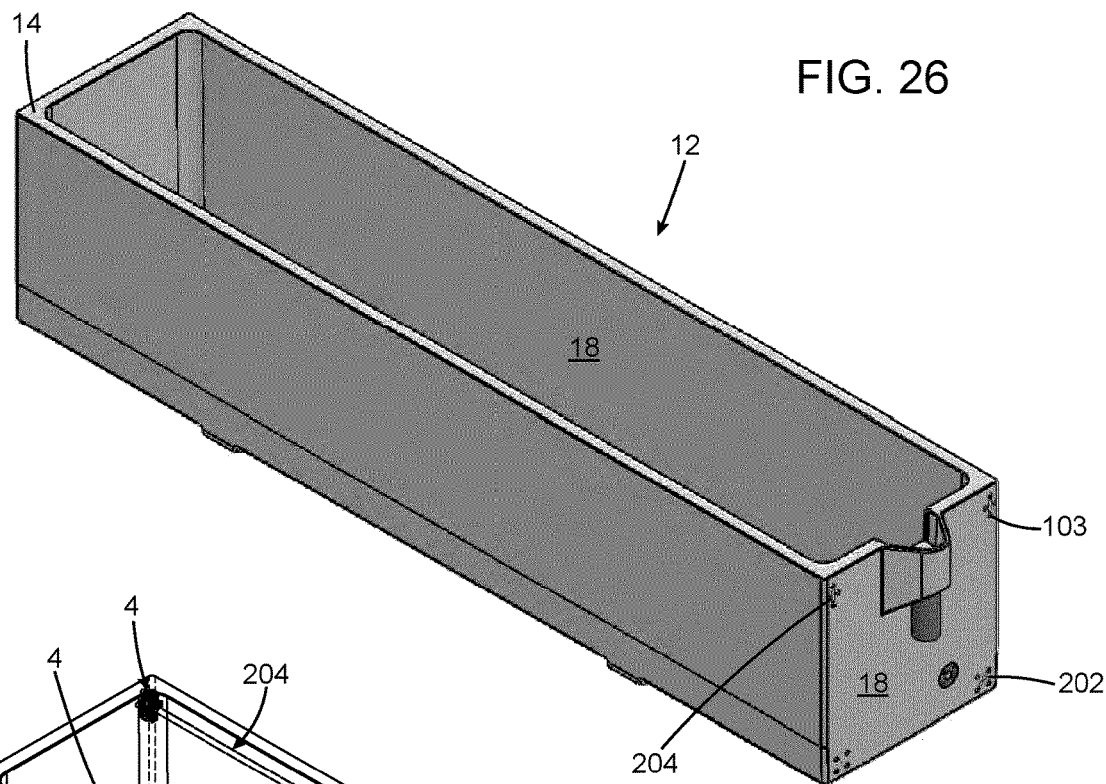
FIG. 26 is a perspective view of an electrolytic vessel having two embedded anchor assemblies, including two anchors for one strap, distributed horizontally in each of two side opposed walls of the vessel.

Similar explanations can be made with respect to embedded anchor assemblies (202, 204) in FIG. 26, and to the anchor assembly (206) in FIG. 22, which are extending horizontally within two opposed core walls, such that connectors of these anchor assemblies may be accessible to a lifting device from at least one of an upper portion and a lower portion of the two other opposed core walls (18) of the core (14).

Figure 23:
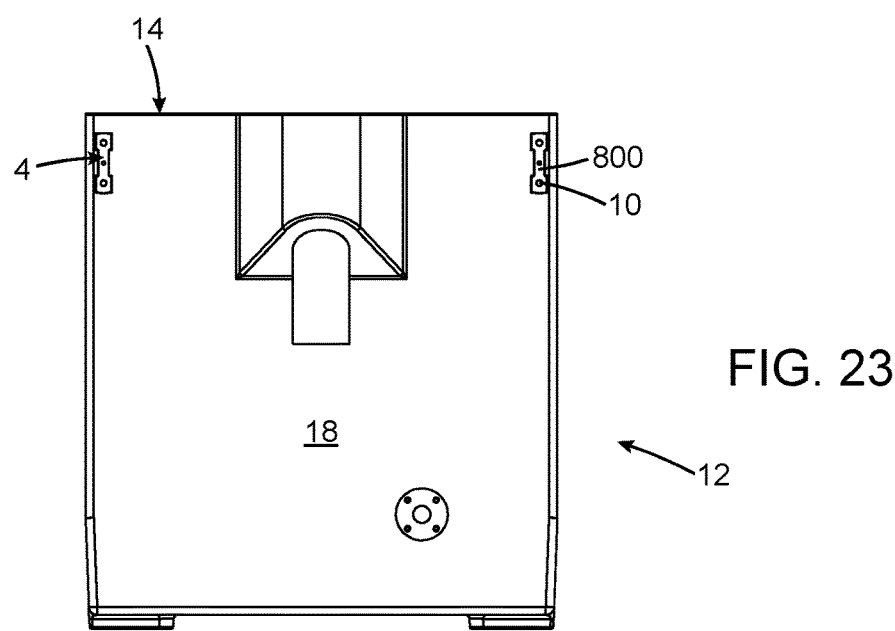
FIG. 23 is a front view of the electrolytic vessel of FIG. 22 showing apparent anchors proximate from edges of a wall of the vessel.
Figure 24:
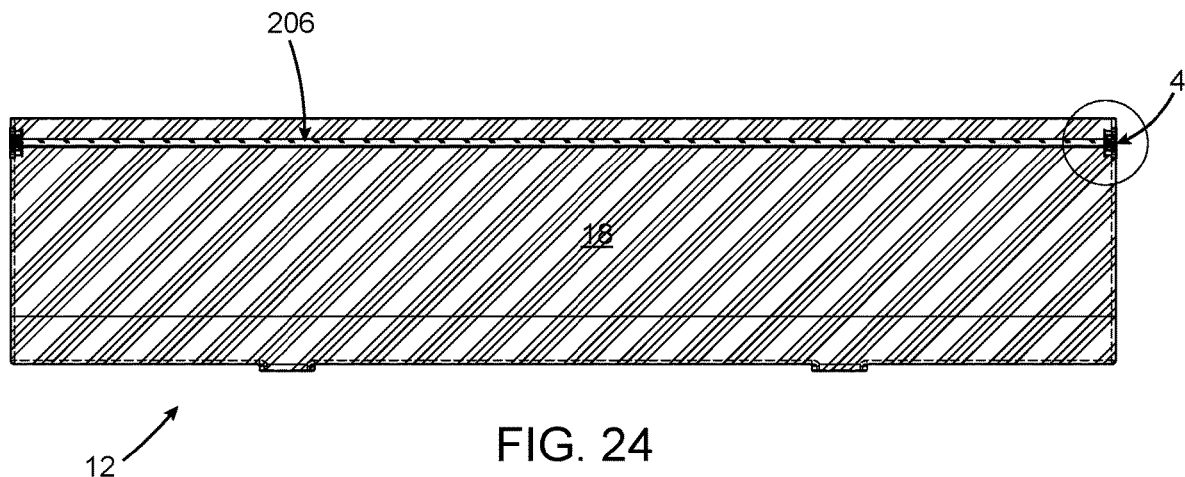
FIG. 24 is a cross-sectional view of a side wall of the vessel of FIG. 22 showing the strap running horizontally.
Figure 25:
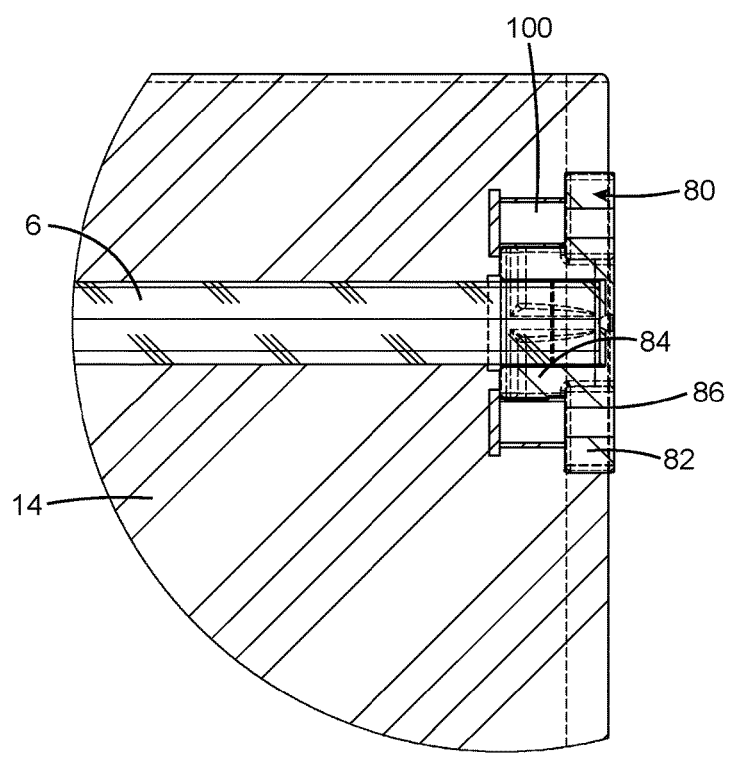
FIG. 25 is a zoomed view of a detail from FIG. 24 showing the interaction between the strap, the main component and the connector from a same anchor assembly.
Figure 33:
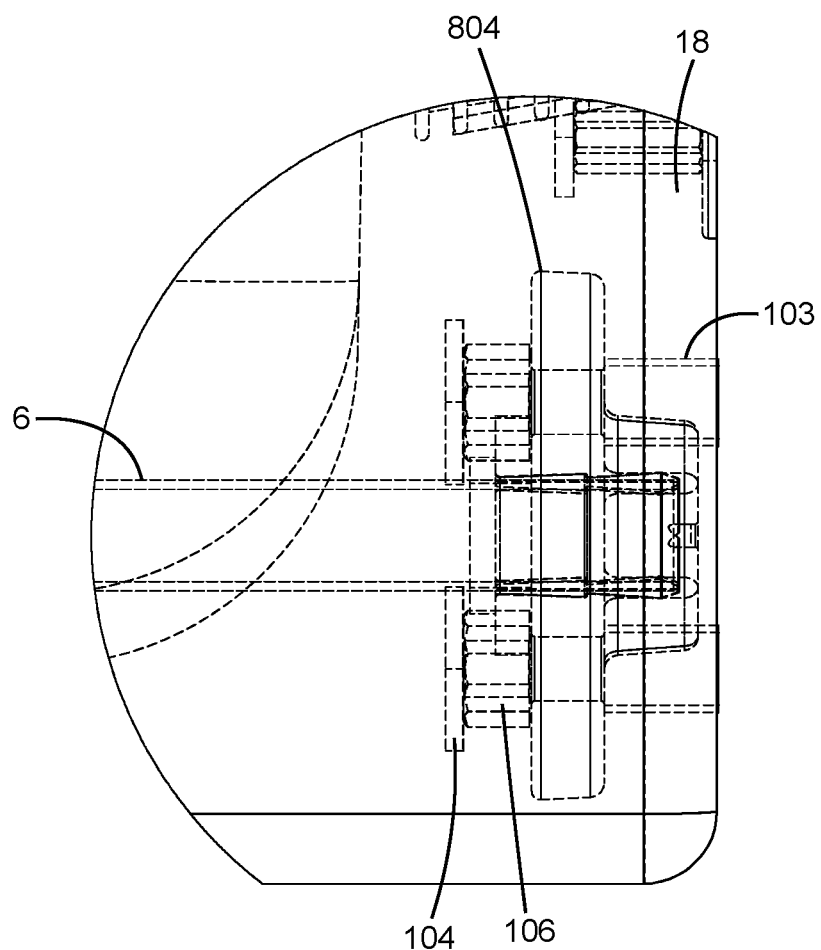
FIG. 33 is a transparent side view of a portion of the vessel of FIG. 27 showing the interaction between the strap, the main component and the connector from the anchor assembly of FIG. 29.
Figure 34:
FIG. 34 is a perspective view of another anchor assembly embedded within the vessel of FIG. 26.
Figure 35:
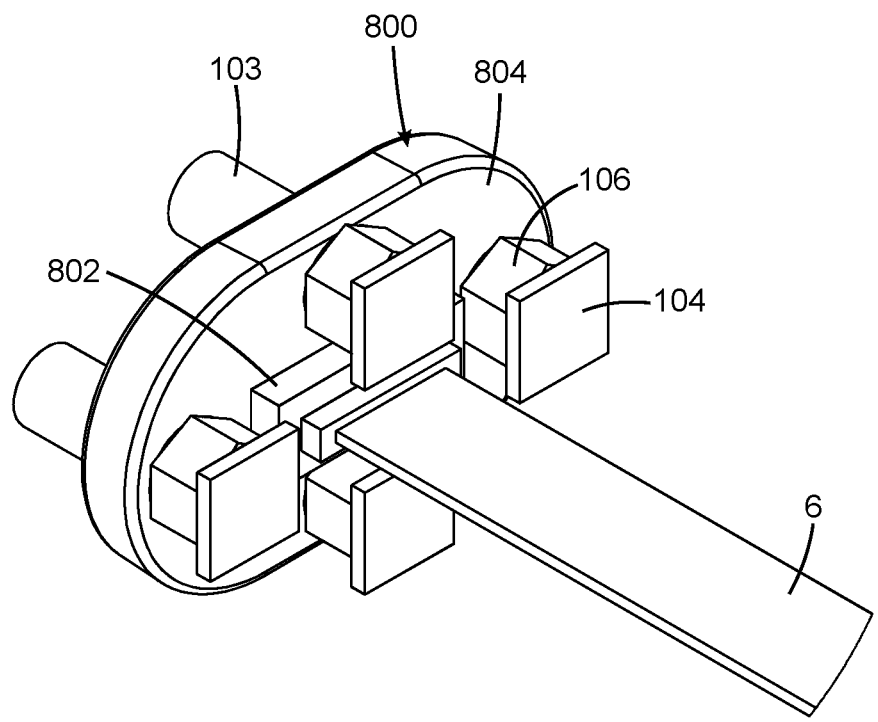
FIG. 35 is a perspective rear view of a portion of the anchor assembly of FIG. 34.
Figure 36:
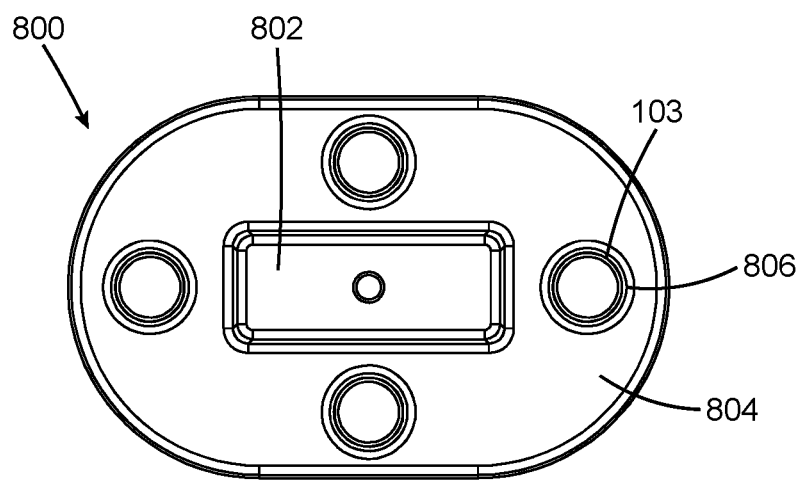
FIG. 36 is a front view of the anchor from the anchor assembly of FIG. 34.
Figure 37:
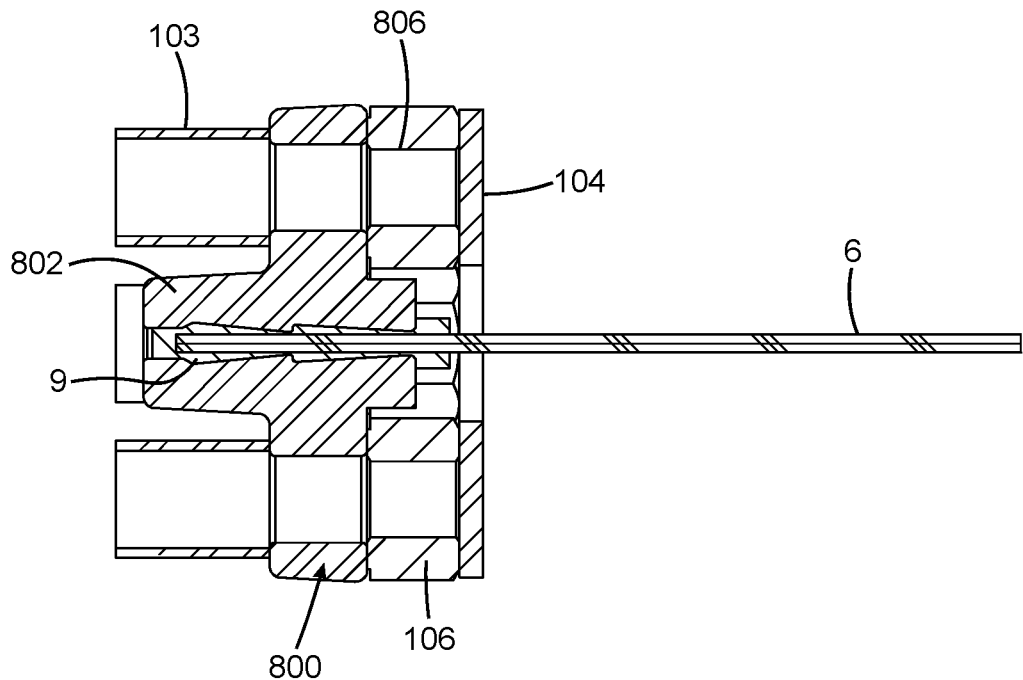
FIG. 37 is a cross-sectional side view of the portion of anchor assembly of FIG. 35.
Figure 38:
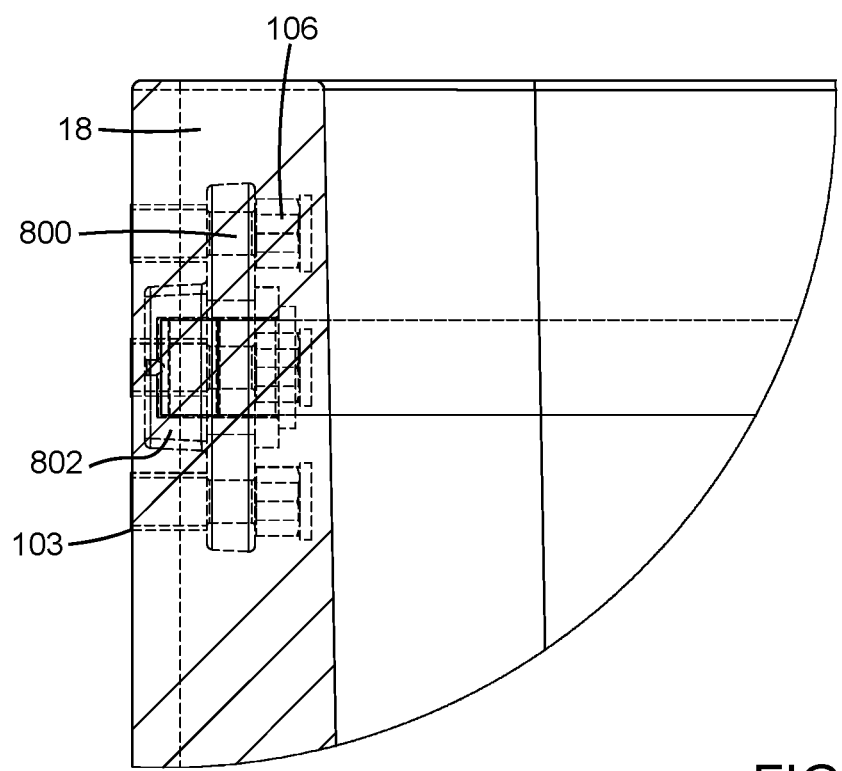
FIG. 38 is a transparent side view of a portion of the vessel of FIG. 27 showing the interaction between the strap, the main component and the connector from the anchor assembly of FIG. 34.

It should be noted that the main component (80) may be exposed from an outer surface of the core (14) as seen on FIGS. 19, 23 and 25, resulting from a flushed configuration of the main component (80) with respect to the outer surface of the core (14). Alternatively, referring to FIGS. 33 and 38, the main component (800) may be staggered with respect to the outer surface of the core (14) such that only a distal end of the barrel (103) of the connector is exposed from an outer surface of the core (14).

It should further be noted that two different anchor assemblies may run vertically or horizontally within a same core wall. For example, as seen on FIG. 27, straps (6) of a pair of anchor assemblies (202) and anchor assemblies (204) may extend horizontally and along each other from one side to the other side of each of two opposed core walls (18), such that four anchors (4), each including four barrels (103), are accessible from respective upper portion and lower portion of each of the two remaining opposed core walls (18). As an alternative embodiment, as seen on FIG. 39, straps (6) of a pair of anchor assemblies (202) and anchor assemblies (206) may be embedded similarly with two opposed core walls (18).

Figure 59:
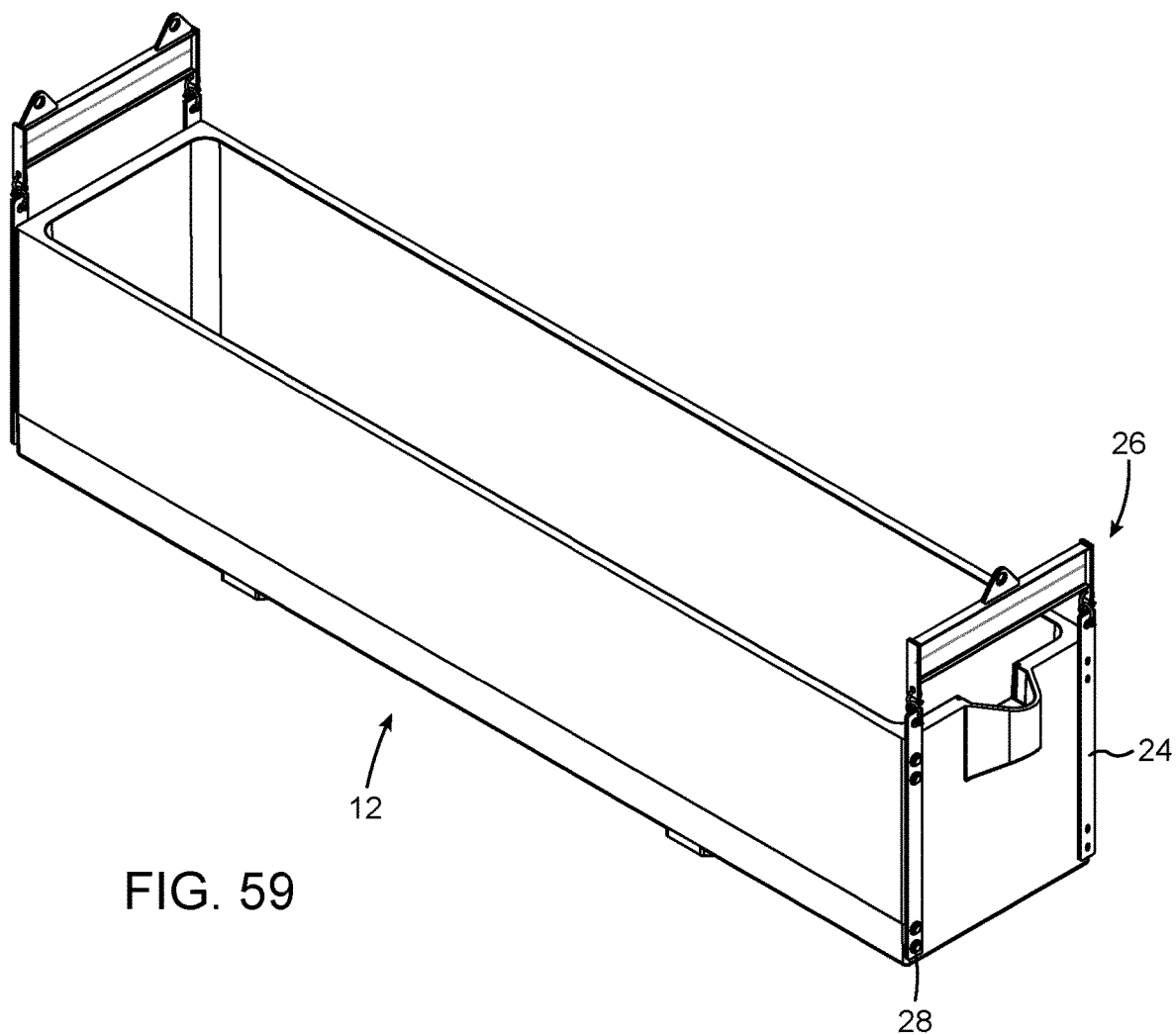
FIG. 59 is a top and left side elevational view of a vessel including four anchor assemblies which are engaged with a pair of lifting accessories.

Referring to FIG. 59, implementations of the anchor assemblies described herein are adapted for use in combination, for example, with a lifting plate (24) of a lifting accessory (26) which can be actuated by a lifting device (not illustrated in FIG. 59) for lifting the vessel (12). Referring to FIG. 60, one or more fastener(s), such as screws (28), are used to secure the lifting plate (24) via insertion into corresponding apertures of the lifting plate (26), channel (86) and threaded barrel (102) successively until abutting on distal plate (104). The lifting system can be tailored to include on or more lifting plates, each lifting plate having apertures for cooperating with a precise amount of connectors of the anchor assemblies provided within the vessel. For example, as seen in FIGS. 59 and 60, a same lifting plate can be shaped to be anchored to an upper anchor assembly and a lower anchor assembly provided at each of the two edge portions of a side wall of the vessel. Several lifting plates, for example two lifting plates (24) as seen in FIG. 59, can be connected to the same lifting accessory (26) via interconnected fastening elements. One skilled in the art will readily understand that the number and position of the lifting plates can be chosen according to the size and weight of the vessel to be lifted. Preferably, a symmetrical configuration can be used to lift the vessel to avoid any unbalanced movements during lifting of the vessel.

Figure 44:
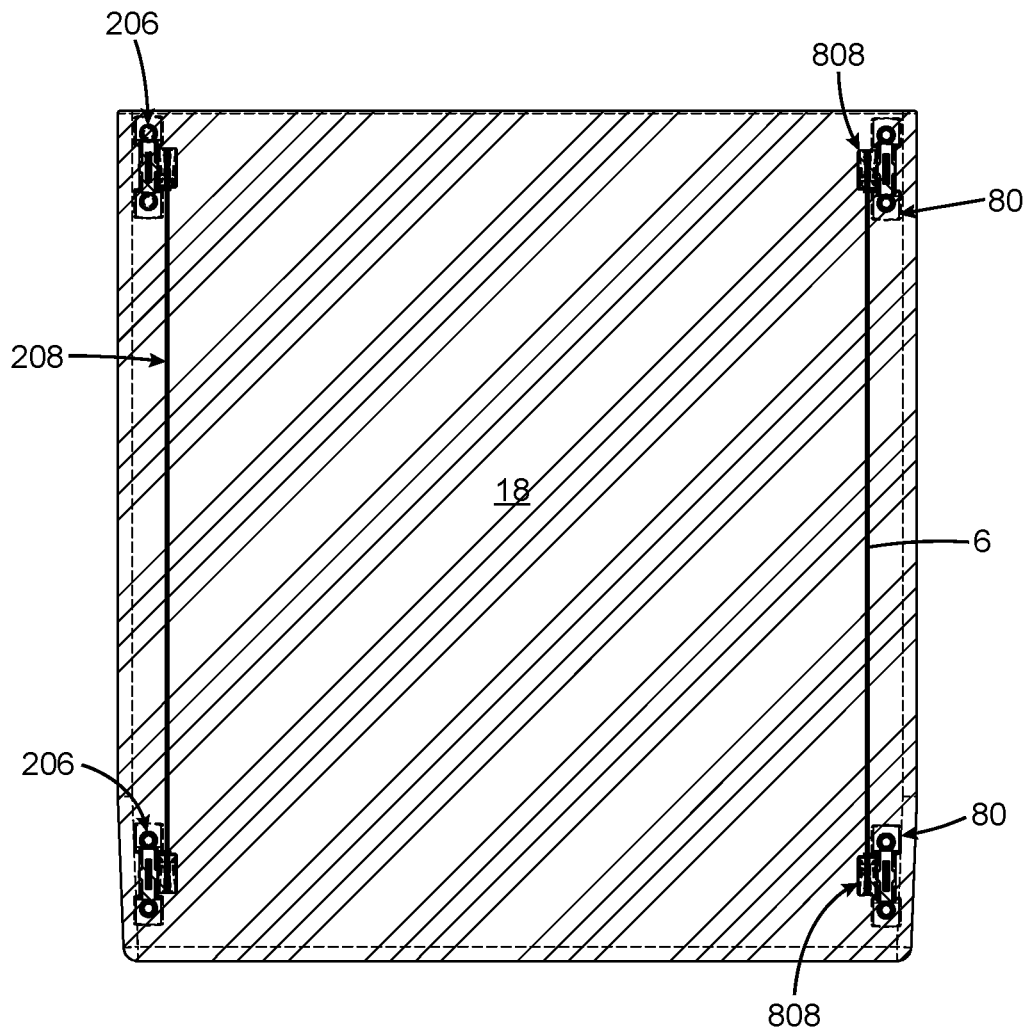
FIG. 44 is a cross-sectional view of the front wall of the vessel of FIG. 42.
Figure 45:
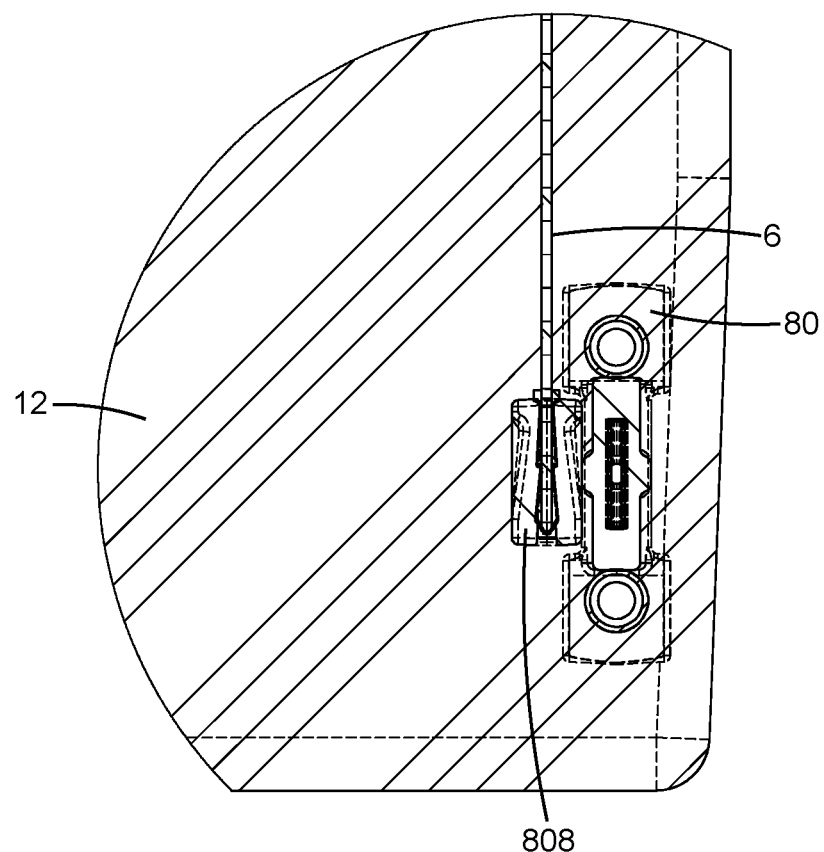
FIG. 45 is a zoomed view of a portion of FIG. 44 showing the interaction between main components of respective joining assembly and anchor assembly.

In another vessel embodiment illustrated in FIG. 44 for example, other combinations of anchor assemblies may be envisaged to further reinforce the vessel and distribute the dynamic loads uniformly within the vessel. A joining assembly (208) (better seen on FIG. 46) may extend vertically from each main component (80) of an anchor assembly (206) extending horizontally in an upper portion of a core wall (18), and to each main component (80) of another anchor assembly (206) extending horizontally in a lower portion of the same core wall (18). The resulting reinforcing web (better seen in FIG. 47) is thereby embedded within two opposed core walls (18). FIGS. 45 and 48 show the particular configuration of the main component (808) of the joining assembly (208) in connection with the main component (80) of the anchor assembly (206). The shape of the main component of the joining assembly may be chosen to maximize the contact surface with the main component of the anchor assembly.

Figure 50:
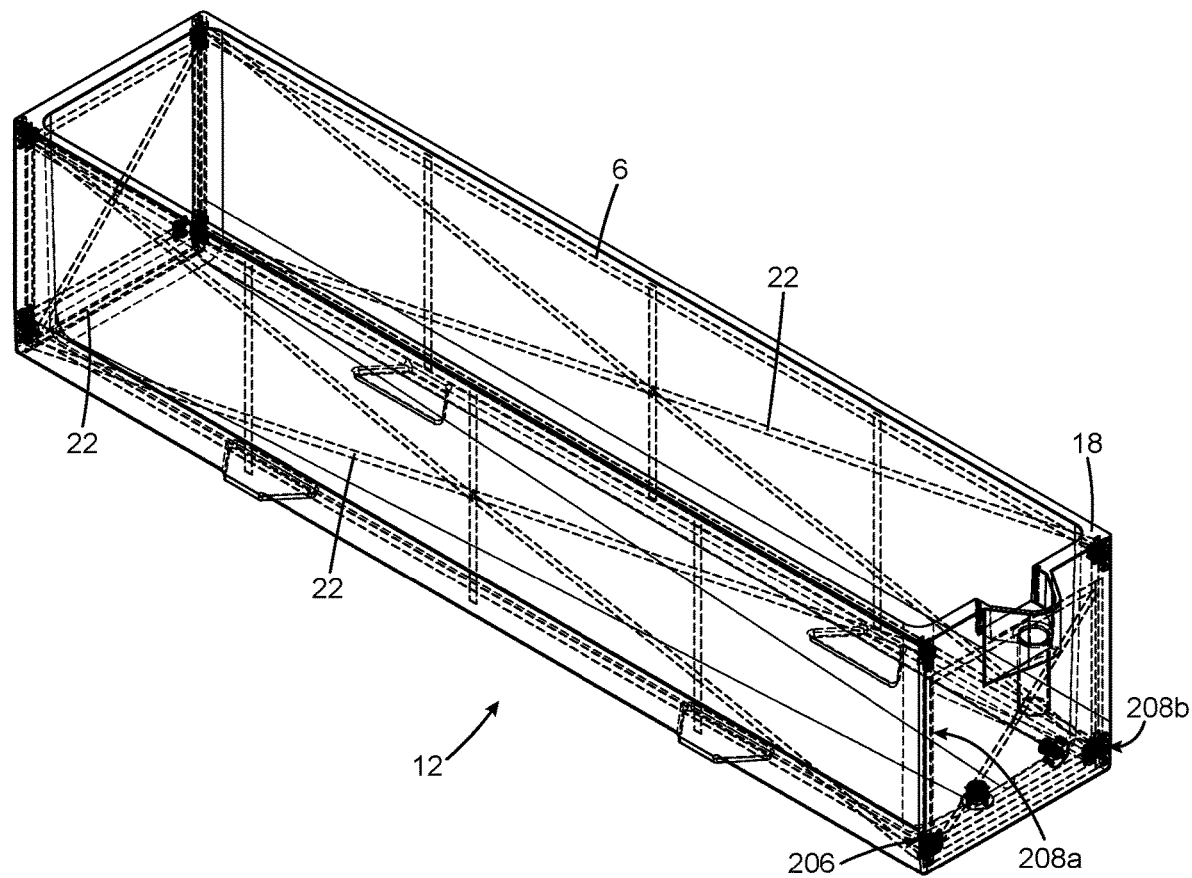
FIG. 50 is a transparent perspective view of an electrolytic vessel having two embedded anchor assemblies, including two anchors for one strap, distributed horizontally in each of two opposed walls of the vessel; two joining assemblies distributed vertically in each of the two opposed walls of the vessel; and two crossed flat rebars embedded in each of wall of the vessel.
Figure 51:
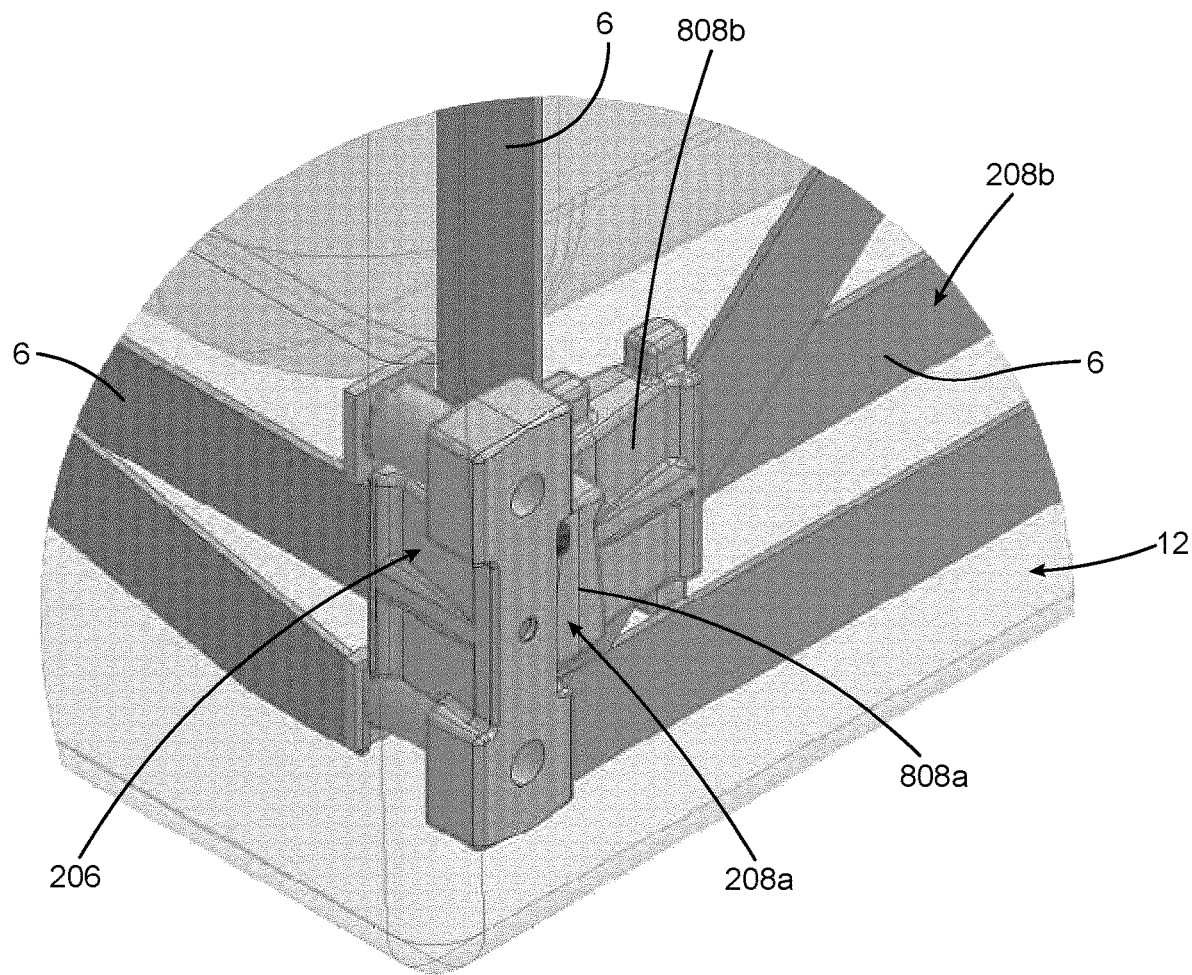
FIG. 51 is a zoomed portion of FIG. 50.
Figure 52:
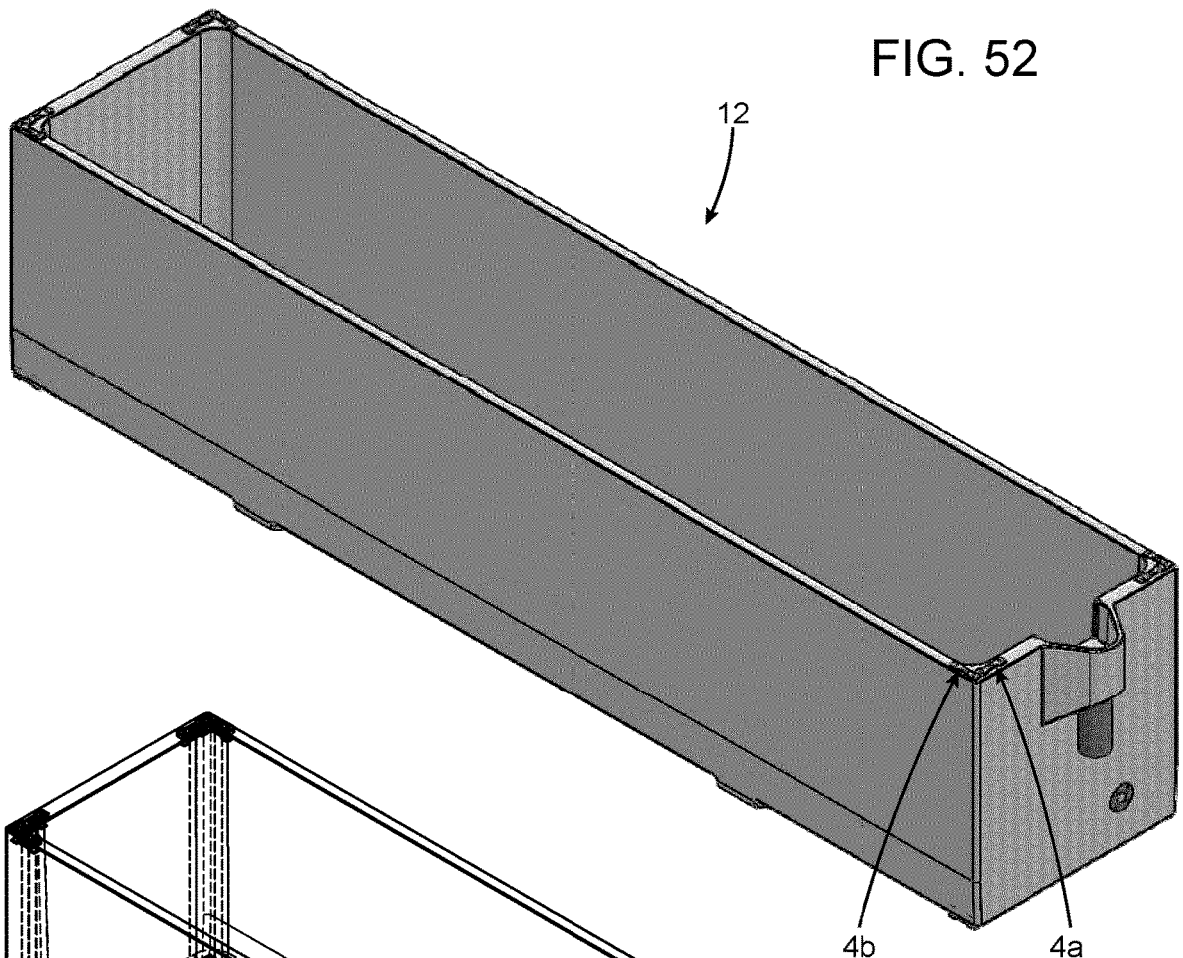
FIG. 52 is a perspective view of an electrolytic vessel having two embedded anchor assemblies distributed vertically in each of two side opposed walls of the vessel; and two anchor assemblies distributed vertically in each of the two remaining opposed walls of the vessel.
Figure 53:
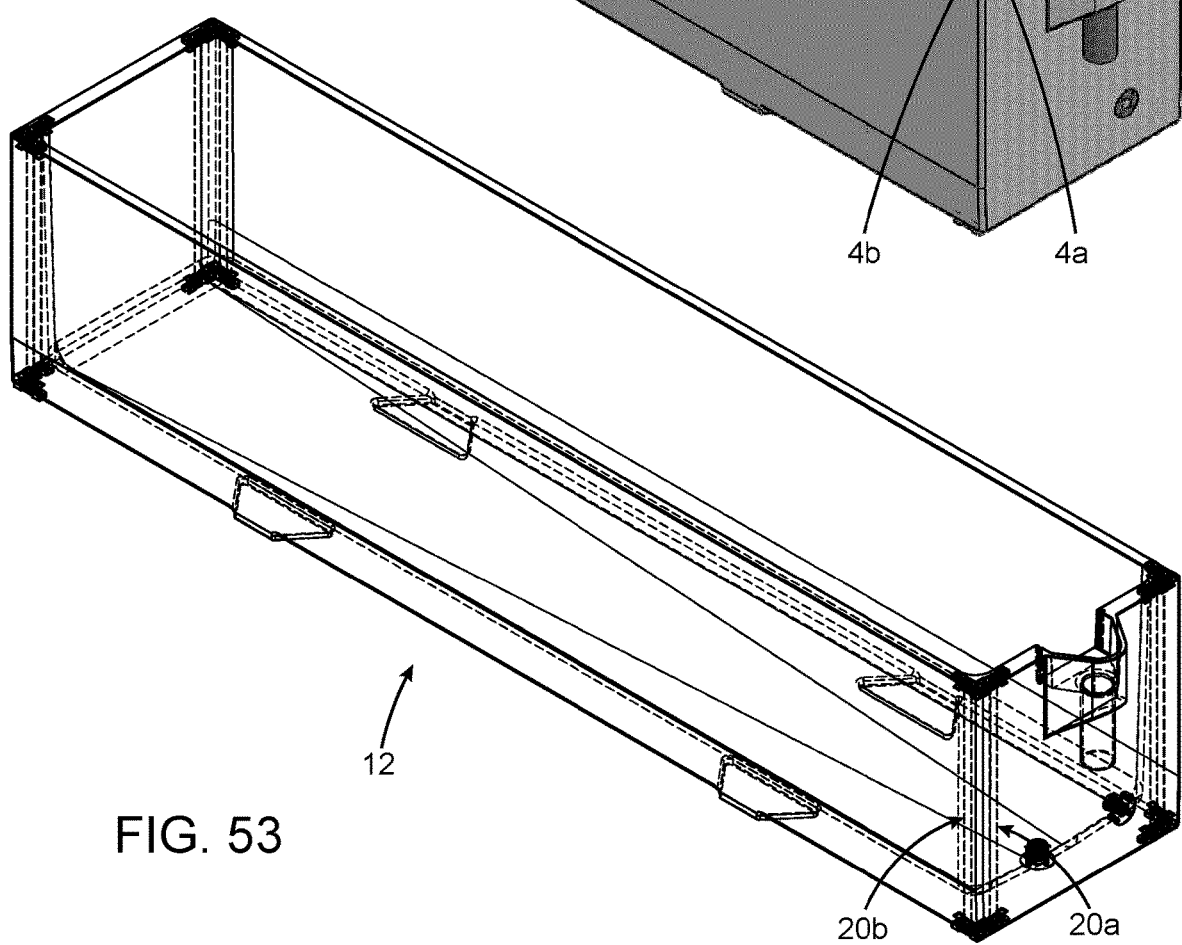
FIG. 53 is a transparent perspective view of the vessel of FIG. 52.

In another vessel embodiment illustrated in FIGS. 50 and 51, a first joining assembly (208a) and a second joining assembly (208b) may be used to create an extended reinforcing web. As better seen on FIG. 51, the first joining assembly (208a) extends vertically and is used to link the anchor assembly (206) extending horizontally in a lower portion of the side core wall to another anchor assembly (206, not seen on FIG. 51) extending horizontally in an upper portion of said side core wall. The second joining assembly (208b) extends from the main component (808a) of the first joining assembly (208a) unto a main component of a mirror reinforcing web extending in the opposed side core wall (not seen on FIG. 51).

It should be noted that, even if at least a portion of the anchor assembly is embedded in a core wall, the connectors should be accessible to the lifting device from an outer surface of the core. The connectors may be directly accessible from the outside of the vessel, or access to the connectors from the outside of the vessel may be indirectly performed by a simple operation such as unplugging an aperture to the connector or removing a protective layer from the connector.

Figure 61:
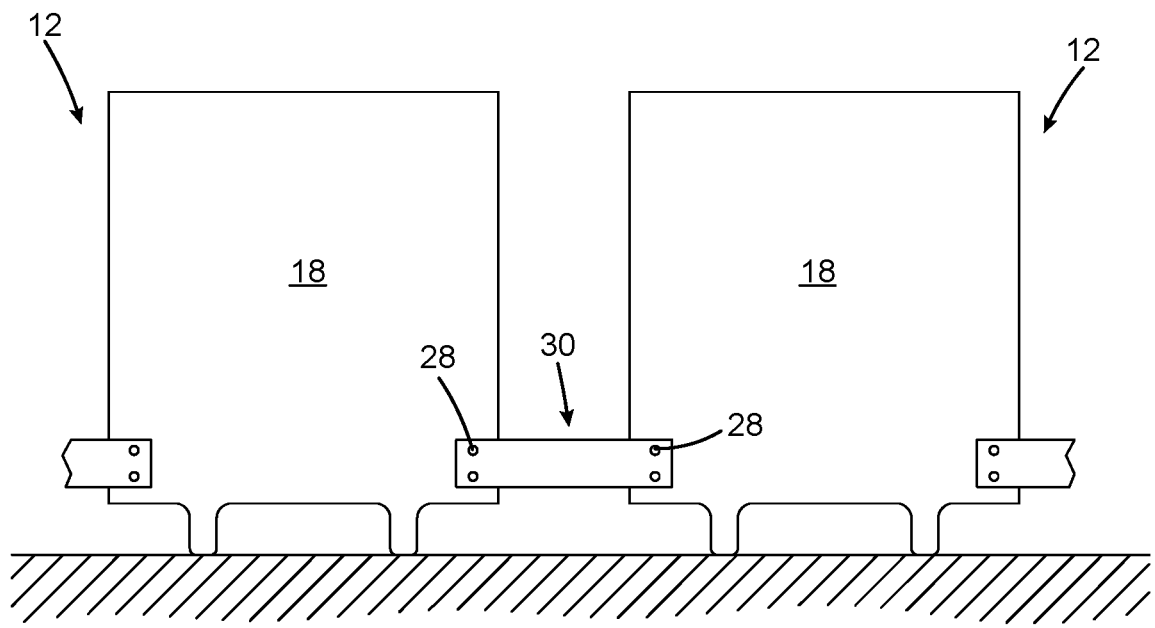
FIG. 61 is a schematic view of two adjacent electrolytic vessels connected together with a linking accessory secured to anchor assemblies of the vessels.
Figure 62:
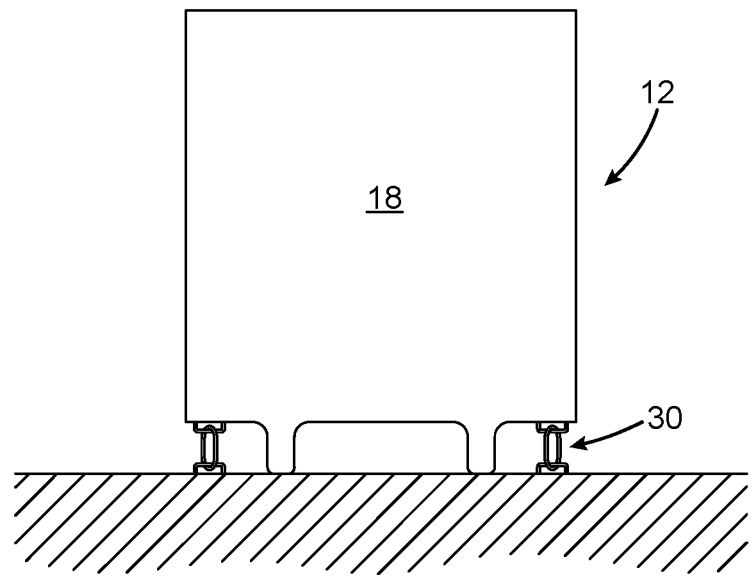
FIG. 62 is a schematic view of an electrolytic vessel including two anchor assemblies engaging chains to anchor the vessel to the ground.
Figure 63:
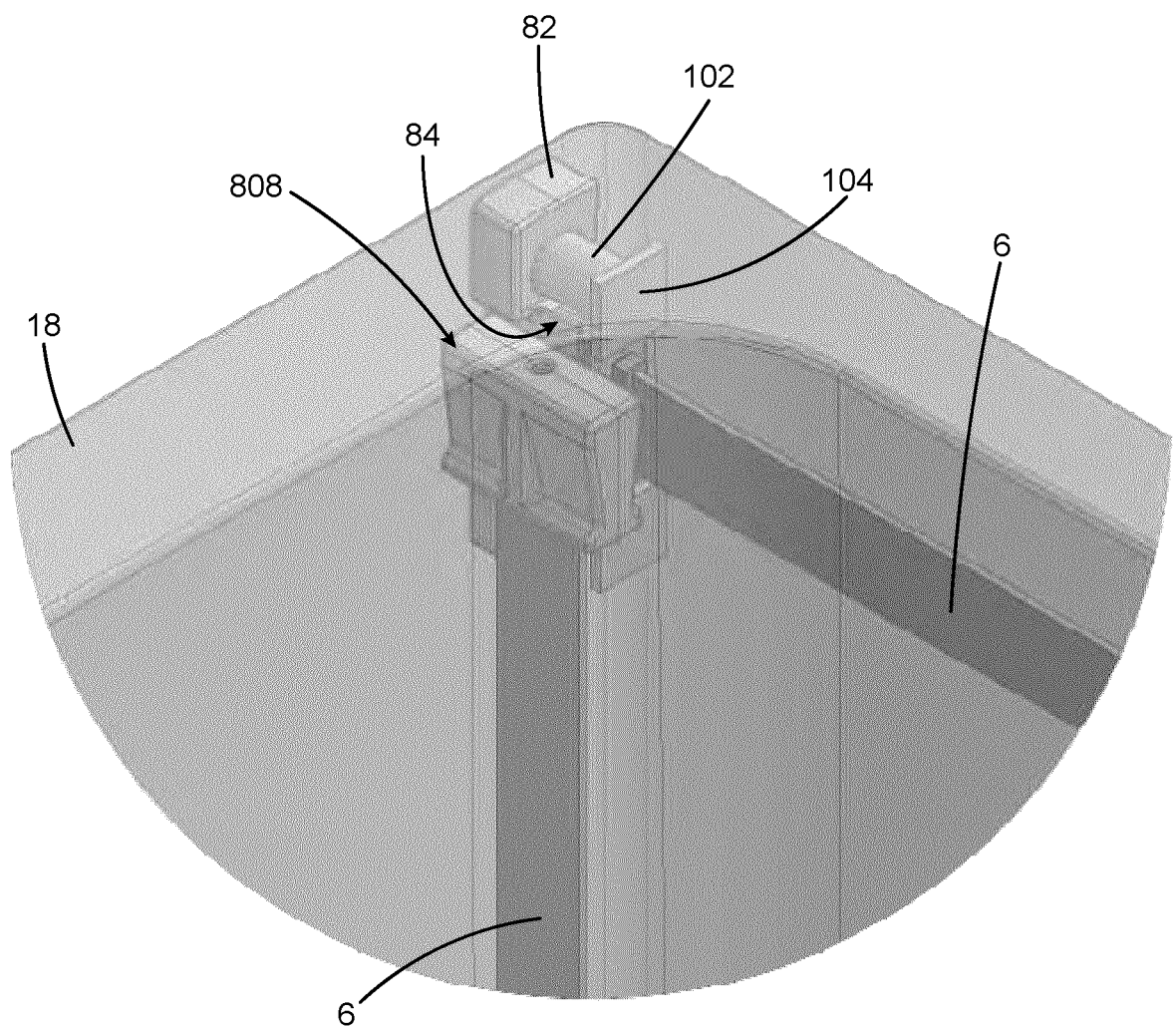
FIG. 63 is a semi-transparent view of a portion of an upper corner of the electrolytic vessel of FIG. 43 showing the interaction between main components of respective joining assembly and anchor assembly.

In some embodiments, the connectors of the anchor assemblies may be secured via screws (28) to a linking accessory (30) for connecting two adjacent vessels (12) together (as seen for example on FIG. 61), and/or for anchoring a vessel (12) to the ground (as seen on FIG. 62).

Fiberglass-Based Envelope

The electrolytic vessel may further optionally comprise a fiberglass-based envelope surrounding an inner surface (substantially corresponding to the cavity receiving the electrolytic liquid) and an outer surface of the core.

According to another embodiment of the electrolytic vessel, the mechanical resistance of the vessel walls to internal and external stresses is further improved by the use of a multiple-layer fiberglass-based envelope surrounding the core of the vessel.

The envelope may include at least one continuous fiberglass-based layer. Further optionally, the envelope may include multiple fiberglass-based layers. Further optionally, the fiberglass-based envelope includes multiple layers of at least one of fiberglass mat, knitted fiberglass, stitched, stitched-mat, knitted-mat and fiberglass woven roving. Optionally, the fiberglass-based envelope may include successive layers of fiberglass mat, knitted fiberglass, stitched, stitched-mat, knitted-mat and fiberglass woven roving. It should be understood that the choice of fiberglass-based material for the envelope may depend for example on the desired orientation of the fibers.

Alternatively, it should be understood that an outer envelope can be thinner in terms of chemical protection or structural protection than the inner envelope which is in contact with the electrolytic bath.

It should be also understood that the continuous fiberglass-based layer refers to a layer including fiberglass layering continuously at least the inner surface of the core. For example, a continuous fiberglass woven roving layer included in the fiberglass-based envelope may result from the superposition of two one-piece fiberglass woven roving extending from one vessel wall to the opposed vessel wall.

It should be noted that access to the connectors from the outside of the vessel may be indirectly performed by a simple operation such as unplugging an aperture to the connector or removing a protective layer from the connector. For example, when the core of the vessel is layered with a fiberglass envelope, access to the connectors of the anchor assembly may be performed by destroying a portion of the fiberglass envelope covering the connectors. A new layer of fiberglass coating may be reapplied on the connectors once the lifting phase is performed and the vessel has been put back into place for metal refining operations.

Alternatively, access to the connectors may be ensured by pre-drilling the different layers of the outer envelope when manufacturing the vessel with embedded anchor assemblies.

Rebars

Figure 49:
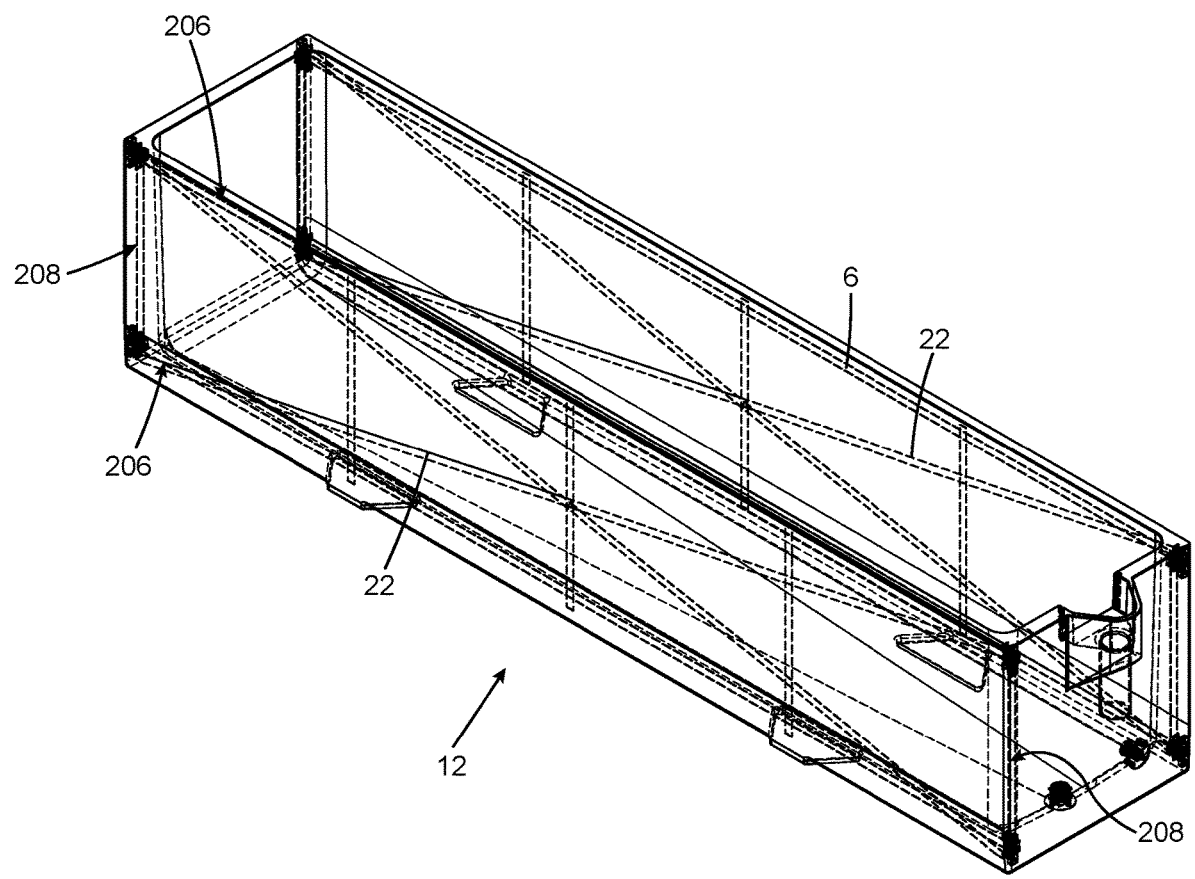
FIG. 49 is a transparent perspective view of an electrolytic vessel having two embedded anchor assemblies, including two anchors for one strap, distributed horizontally in each of two opposed walls of the vessel; two joining assemblies distributed vertically in each of the two opposed walls of the vessel; and two crossed flat rebars embedded in each of the two opposed walls.

Referring to FIGS. 49 and 50, the electrolytic vessel can be reinforced with a plurality of flat rebars (22) embedded in at least two opposed walls of the core. Flat rebars can offer improved tensile strength when the core walls are subjected to internal and external stresses. The number and orientation of the embedded flat rebars may vary and can be adapted according to certain configurations and materials of the vessel. FIG. 49 illustrates a reinforced vessel with a pair of crossed flat rebars in two opposed core walls whereas FIG. 50 illustrates a reinforced vessel with a pair of crossed flat rebars in each wall of the core and additional horizontal rebars. The reinforced rebars offers complementary strength during lifting when movements of the overhead crane can change the dynamic loads or generate vibrations. Optionally, the flat rebars may be made of pultruded fiberglass.

It should be noted that end portions of the rebars may be in juxtaposition with the corresponding anchor assembly or connected to this anchor assembly by welding, chemical fixation or any suitable means according to the material involved.

It should be noted that the rebars can be manufactured similarly to the straps (same material, thickness, etc.) such that they can be used in connection to the anchor assemblies or used as straps by being inserted in strap slots of the anchors.

Manufacture Implementations

In a particular embodiment, the vessel may be constructed starting from two envelopes in composite fiberglass, one interior envelope and another exterior envelope. The inner envelope may be made of a multiplicity of fiberglass layers. While coating the inner envelope, or after coating, the outside envelope is constructed of fiberglass layers, leaving a space between the two envelopes to form a cavity. Then, anchor assemblies and optionally rebars, are strategically placed at desired locations within the cavity created between the inner envelope and the outer envelope, and are held with tools well known in the art (such as studs or pins), while the cavity is then filled with polymer concrete to create the core of the vessel. The outer envelope may have a composition and/or thickness which differ from the inner envelope. A chemical treatment or another coating may be added to the envelopes depending on the properties that are to be given to the envelopes. For example, a resin coating including synthetic fibers may offer enhanced corrosion resistance to the inner envelope. In another example, additional layers of fiberglass may coat the outer envelope to enhance strength resistance of the outer envelope.

It should be noted that the surface of the anchor assemblies and rebars may be ground and properly chemically treated. For example, the strap may be chemically treated with silane, to provide covalent chemical adhesion with the polymer concrete resin.

It should be understood that any one of the abovementioned optional aspects of each system and technique may be combined with any other of the aspects thereof, unless two aspects clearly cannot be combined due to their mutually exclusivity. For example, the various structural elements of the anchor assembly described herein and/or in the appended Figures, may be combined with any of the general electrolytic vessel description appearing herein and/or in accordance with the appended claims.

The invention claimed is:

1. An electrolytic vessel for refining metals and being liftable by a lifting device, the electrolytic vessel comprising:
    a core shaped to hold an electrolytic liquid, the core comprising:
        a core base for contacting a floor, and
        four core walls extending upwardly from peripheral edges of the core base; and
    at least one anchor assembly being at least partially embedded in each of two opposed core walls, each anchor assembly comprising:
        an anchor providing anchorage to a lifting accessory of the lifting device; and
        a strap connected to the anchor and extending from the anchor along and inside at least a portion of a corresponding core wall;
    wherein the anchor comprises:
        a main component having a strap slot for receiving the strap therein; and
        a connector mounted about the main component and connectable to the lifting accessory.

2. The electrolytic vessel of claim 1, wherein the connector is protruding from an outer surface of the core.

3. The electrolytic vessel of claim 1, wherein the connector is embedded in the core and connectable to the lifting accessory via at least one aperture in an outer surface of the core.

4. The electrolytic vessel of claim 3, wherein the connector is embedded in a flushed configuration with respect to the outer surface of the core.

5. The electrolytic vessel of claim 3, wherein the at least one aperture is defined in an external surface of one of the two opposed core walls.

6. The electrolytic vessel of claim 3, wherein the at least one aperture is defined in a bottom surface of the core base.

7. The electrolytic vessel of claim 3, wherein the main component comprises a main portion including the strap slot and the connector comprises two branch portions extending outwardly from the main portion, each branch portion having a channel sized to receive a mating fastener of the lifting accessory, and each channel being accessible from one aperture in the core.

8. The electrolytic vessel of claim 7, wherein the connector further comprises a pair of barrel bolts, and each channel of the connector is provided at a distal end thereof with one barrel bolt sized and shaped to receive and offer abutment to a portion of the mating fastener protruding from the channel.

9. A process of manufacturing an electrolytic vessel as defined in claim 1, the process comprising:
    forming an inner envelope having a rectangular base and four walls protruding from edges of the base;
    forming an outer envelope along the inner envelope, and leaving a space between the inner envelope and the outer envelope to form a cavity;
    placing at least one anchor assembly in each of two opposed cavity regions at a desired location;
    holding each anchor assembly at the desired location; and
    filling the cavity with a core material to create the core of the vessel.

10. The electrolytic vessel of claim 3, wherein the main component comprises a main portion including the strap slot and the connector comprises a distal plate protruding radially from a distal end of the main portion, the distal plate including at least two channels and each channel being sized to receive a mating fastener of the lifting accessory and being accessible from one aperture in the core.

11. The electrolytic vessel of claim 10, wherein the connector further comprises at least two barrels and nut assemblies, and each channel having a diameter adapted to cooperate at a proximal end thereof with one barrel and at a distal end thereof with a nut.

12. The electrolytic vessel of claim 2, wherein the connector is a hook and the lifting accessory includes a loop which is engageable with the hook.

13. The electrolytic vessel of claim 1, wherein the anchor is a distal anchor connected at one end of the strap and the anchor assembly further comprises a proximal anchor connected at another end of the strap.

14. The electrolytic vessel of claim 1, wherein the anchor is a distal anchor connected at one end of the strap and the anchor assembly further comprises a proximal main component having a strap slot to receive another end of the strap.

15. The electrolytic vessel of claim 1, comprising two anchor assemblies embedded within each of the four core walls, a first anchor assembly being embedded within a first core wall and being connected to the anchor of a second anchor assembly embedded within a second core wall which is adjacent to the first core wall.

16. The electrolytic vessel of claim 1, comprising two anchor assemblies spaced apart within each of the two opposed core walls and the electrolytic vessel further comprising a pair of joining assembly, each joining assembly being sized for joining the two anchor assemblies.

17. The electrolytic vessel of claim 16, wherein each joining assembly comprises:
    a proximal joining component and a distal joining component, each joining component having a strap slot; and
    a joining strap having a distal end received in the strap slot of the distal joining component and a proximal end received in the strap slot of the proximal joining component.

18. The electrolytic vessel of claim 17, wherein the proximal joining component is connected to the anchor of one of the two anchor assemblies and the distal joining component is connected to the anchor of the other anchor assembly.

19. The electrolytic vessel of claim 1, wherein:
    at least one strap extends horizontally from one side edge of the core wall to an opposed side edge of the core wall;

at least one strap extends vertically from an upper portion of the core wall to a lower portion of the core wall; or a first strap extends horizontally in the upper portion of the core wall and a second strap extends horizontally in the lower portion of the core wall.

* * * * *